US012639983B2

(12) United States Patent
Devlin et al.

(10) Patent No.: US 12,639,983 B2
(45) Date of Patent: May 26, 2026

(54) SPOOF-RESISTANT FACIAL RECOGNITION THROUGH ILLUMINATION AND IMAGING ENGINEERING

(71) Applicant: Metalenz, Inc., Boston, MA (US)

(72) Inventors: Robert C. Devlin, Stoneham, MA (US); Xiangdong Wang, Carlisle, MA (US)

(73) Assignee: Metalenz, Inc., Boston, MA (US)

( * ) Notice: Subject to any disclaimer, the term of this patent is extended or adjusted under 35 U.S.C. 154(b) by 644 days.

(21) Appl. No.: 18/067,640

(22) Filed: Dec. 16, 2022

(65) Prior Publication Data

US 2023/0196842 A1 Jun. 22, 2023

Related U.S. Application Data

(60) Provisional application No. 63/265,617, filed on Dec. 17, 2021.

(51) Int. Cl.
*G06V 40/40* (2022.01)
*G01J 4/00* (2006.01)
(Continued)

(52) U.S. Cl.
CPC ................ *G06V 40/40* (2022.01); *G01J 4/00* (2013.01); *G06V 10/141* (2022.01); *G06V 10/761* (2022.01); *G06V 2201/07* (2022.01)

(58) Field of Classification Search
CPC ...... G06V 40/40; G06V 10/60; G06V 40/172; G06V 20/64; G01J 4/00
See application file for complete search history.

(56) References Cited

U.S. PATENT DOCUMENTS 3,877,034 A 4/1975 Nelson
4,777,116 A 10/1988 Kawatsuki et al.
(Continued)

FOREIGN PATENT DOCUMENTS

CA 3006173 A1 6/2017
CA 3020261 A1 10/2017
(Continued)

OTHER PUBLICATIONS

Wikipedia contributors. "Stokes parameters." Wikipedia, The Free Encyclopedia. Wikipedia, The Free Encyclopedia, Dec. 3, 2020. Web. Jun. 24, 2025. (Year: 2020).*
(Continued)

*Primary Examiner* — Stephen R Koziol
*Assistant Examiner* — Ashley Hytrek
(74) *Attorney, Agent, or Firm* — KPPB LLP

(57) ABSTRACT
Disclosed herein systems and methods of performing spoof resistant object recognition. In certain embodiments, a system for object recognition includes: an illumination device configured to illuminate an object; a sensor device, wherein the sensor device receives illumination light reflected off the object which includes polarization information; a processor; memory including programming executable by the processor to: calculate the polarization information from the illumination light; use the polarization information to determine whether the object is a real 3D object. It has been discovered that polarization information may be utilized to determine whether an object is a 3D object or a flat (2D) object. Thus, the polarization information may be utilized to differentiate from an image of a 3D object and a photograph of an object.

18 Claims, 9 Drawing Sheets
(4 of 9 Drawing Sheet(s) Filed in Color)

(51) Int. Cl.
    *G06V 10/141*        (2022.01)
    *G06V 10/74*         (2022.01)

(56)           References Cited

U.S. PATENT DOCUMENTS

| | | | |
|---|---|---|---|
| 4,856,899 A | 8/1989 | Iwaoka et al. | |
| 5,085,496 A | 2/1992 | Yoshida et al. | |
| 5,245,466 A | 9/1993 | Burns et al. | |
| 5,337,146 A | 8/1994 | Azzam | |
| 5,452,126 A | 9/1995 | Johnson | |
| 5,620,792 A | 4/1997 | Challener, IV | |
| 5,840,447 A | 11/1998 | Peng | |
| 6,097,856 A | 8/2000 | Hammond | |
| 6,643,065 B1 | 11/2003 | Silberman | |
| 6,669,803 B1 | 12/2003 | Kathman et al. | |
| 6,731,839 B2 | 5/2004 | Bhagavatula et al. | |
| 6,825,986 B2 | 11/2004 | Ashkinazy et al. | |
| 6,834,027 B1 | 12/2004 | Sakaguchi et al. | |
| 6,924,457 B2 | 8/2005 | Koyama et al. | |
| 6,927,922 B2 | 8/2005 | George et al. | |
| 7,057,151 B2 | 6/2006 | Lezec et al. | |
| 7,061,612 B2 | 6/2006 | Johnston | |
| 7,061,693 B2 | 6/2006 | Zalevsky | |
| 7,171,078 B2 | 1/2007 | Sasaki et al. | |
| 7,171,084 B2 | 1/2007 | Izumi et al. | |
| 7,186,969 B2 | 3/2007 | Altendorf et al. | |
| 7,241,988 B2 | 7/2007 | Gruber et al. | |
| 7,324,210 B2 | 1/2008 | De et al. | |
| 7,327,468 B2 | 2/2008 | Maznev et al. | |
| 7,402,131 B2 | 7/2008 | Mueth et al. | |
| 7,450,618 B2 | 11/2008 | Dantus et al. | |
| 7,547,874 B2 | 6/2009 | Liang | |
| 7,561,264 B2 | 7/2009 | Treado et al. | |
| 7,576,899 B2 | 8/2009 | Kanesaka et al. | |
| 7,679,830 B2 | 3/2010 | Dowski, Jr. | |
| 7,684,097 B2 | 3/2010 | Fukumoto et al. | |
| 7,773,307 B2 | 8/2010 | Shih | |
| 7,800,683 B2 | 9/2010 | Zalevsky et al. | |
| 7,812,295 B2 | 10/2010 | Zalevsky et al. | |
| 7,928,900 B2 | 4/2011 | Fuller et al. | |
| 7,929,220 B2 | 4/2011 | Sayag | |
| 7,965,607 B2 | 6/2011 | Fukumoto et al. | |
| 8,009,358 B2 | 8/2011 | Zalevsky et al. | |
| 8,040,604 B2 | 10/2011 | Zalevsky et al. | |
| 8,107,705 B2 | 1/2012 | Dowski, Jr. et al. | |
| 8,152,307 B2 | 4/2012 | Duelli et al. | |
| 8,169,703 B1 | 5/2012 | Mossberg et al. | |
| 8,192,022 B2 | 6/2012 | Zalevsky | |
| 8,212,866 B2 | 7/2012 | Lemmer et al. | |
| 8,318,386 B2 | 11/2012 | Kobrin | |
| 8,328,396 B2 | 12/2012 | Capasso et al. | |
| 8,351,048 B2 | 1/2013 | Millerd | |
| 8,351,120 B2 | 1/2013 | Deng et al. | |
| 8,390,932 B2 | 3/2013 | Jia et al. | |
| 8,400,494 B2 | 3/2013 | Zalevsky et al. | |
| 8,430,513 B2 | 4/2013 | Chang et al. | |
| 8,451,368 B2 | 5/2013 | Sung et al. | |
| 8,472,797 B2 | 6/2013 | Ok et al. | |
| 8,481,948 B2 | 7/2013 | Frach et al. | |
| 8,558,873 B2 | 10/2013 | Mceldowney | |
| 8,587,474 B2 | 11/2013 | Fuller et al. | |
| 8,649,631 B2 | 2/2014 | Islam et al. | |
| 8,681,428 B1 | 3/2014 | Brown | |
| 8,687,040 B2 | 4/2014 | Silveira | |
| 8,716,677 B2 | 5/2014 | Cui | |
| 8,734,033 B2 | 5/2014 | Walters et al. | |
| 8,743,923 B2 | 6/2014 | Geske et al. | |
| 8,816,460 B2 | 8/2014 | Kalevo et al. | |
| 8,848,273 B2 | 9/2014 | Yu et al. | |
| 8,876,289 B2 | 11/2014 | Diaz et al. | |
| 8,908,149 B2 | 12/2014 | Freimann | |
| 8,912,973 B2 | 12/2014 | Werner et al. | |
| 8,981,337 B1 | 3/2015 | Burckel et al. | |
| 9,007,451 B2 | 4/2015 | Rogers et al. | |
| 9,116,302 B2 | 8/2015 | Mccarthy et al. | |
| 9,151,891 B2 | 10/2015 | Ma et al. | |
| 9,212,899 B2 | 12/2015 | Johnson et al. | |
| 9,298,060 B2 | 3/2016 | Shen et al. | |
| 9,309,274 B2 | 4/2016 | Van Der Boom et al. | |
| 9,310,535 B1 | 4/2016 | Greiner et al. | |
| 9,329,484 B1 | 5/2016 | Markle et al. | |
| 9,330,704 B2 | 5/2016 | Nishimura et al. | |
| 9,367,036 B2 | 6/2016 | Pyun et al. | |
| 9,369,621 B2 | 6/2016 | Malone et al. | |
| 9,391,700 B1 | 7/2016 | Bruce et al. | |
| 9,392,153 B2 | 7/2016 | Myhre et al. | |
| 9,411,103 B2 | 8/2016 | Astratov | |
| 9,482,796 B2 | 11/2016 | Arbabi et al. | |
| 9,500,771 B2 | 11/2016 | Liu et al. | |
| 9,536,362 B2 | 1/2017 | Sarwar et al. | |
| 9,553,423 B2 | 1/2017 | Chen et al. | |
| 9,557,585 B1 | 1/2017 | Yap et al. | |
| 9,606,415 B2 | 3/2017 | Zheludev et al. | |
| 9,609,190 B2 | 3/2017 | Lee et al. | |
| 9,704,250 B1 | 7/2017 | Shah et al. | |
| 9,739,918 B2 | 8/2017 | Arbabi et al. | |
| 9,766,463 B2 | 9/2017 | Border et al. | |
| 9,778,404 B2 | 10/2017 | Divliansky et al. | |
| 9,825,074 B2 | 11/2017 | Tian et al. | |
| 9,829,700 B2 | 11/2017 | Parent et al. | |
| 9,835,870 B2 | 12/2017 | Astratov et al. | |
| 9,836,122 B2 | 12/2017 | Border | |
| 9,869,580 B2 | 1/2018 | Grossinger et al. | |
| 9,880,377 B1 | 1/2018 | Safrani et al. | |
| 9,885,859 B2 | 2/2018 | Harris | |
| 9,891,393 B2 | 2/2018 | Reece | |
| 9,939,129 B2 | 4/2018 | Byrnes et al. | |
| 9,947,118 B2 | 4/2018 | Khare et al. | |
| 9,952,096 B2 | 4/2018 | Kats et al. | |
| 9,958,251 B1 | 5/2018 | Brock et al. | |
| 9,967,541 B2 | 5/2018 | Piestun | |
| 9,978,801 B2 | 5/2018 | Park et al. | |
| 9,989,680 B2 | 6/2018 | Arbabi et al. | |
| 9,992,474 B2 | 6/2018 | Grunnet-jepsen et al. | |
| 9,995,859 B2 | 6/2018 | Kamali et al. | |
| 9,995,930 B2 | 6/2018 | Arbabi et al. | |
| 10,007,118 B2 | 6/2018 | Border | |
| 10,054,859 B2 | 8/2018 | Ye et al. | |
| 10,084,239 B2 | 9/2018 | Shaver et al. | |
| 10,108,085 B2 | 10/2018 | Peters et al. | |
| 10,126,466 B2 | 11/2018 | Lin et al. | |
| 10,132,465 B2 | 11/2018 | Byrnes et al. | |
| 10,149,612 B2 | 12/2018 | Muyo et al. | |
| 10,155,846 B2 | 12/2018 | Fuji et al. | |
| 10,234,383 B2 | 3/2019 | Wang et al. | |
| 10,254,454 B2 | 4/2019 | Klug et al. | |
| 10,267,957 B2 | 4/2019 | Kamali et al. | |
| 10,310,148 B2 | 6/2019 | Stewart et al. | |
| 10,310,387 B2 | 6/2019 | Palmer et al. | |
| 10,315,951 B2 | 6/2019 | Toussaint et al. | |
| 10,317,667 B2 | 6/2019 | Waller et al. | |
| 10,324,314 B2 | 6/2019 | Czaplewski et al. | |
| 10,338,275 B1 | 7/2019 | Acosta et al. | |
| 10,341,640 B2 | 7/2019 | Shechtman et al. | |
| 10,345,246 B2 | 7/2019 | Tian et al. | |
| 10,345,519 B1 | 7/2019 | Miller et al. | |
| 10,365,416 B2 | 7/2019 | Zhan et al. | |
| 10,371,936 B2 | 8/2019 | Didomenico | |
| 10,386,620 B2 | 8/2019 | Astratov et al. | |
| 10,388,805 B2 | 8/2019 | Engel et al. | |
| 10,402,993 B2 | 9/2019 | Han et al. | |
| 10,408,416 B2 | 9/2019 | Khorasaninejad et al. | |
| 10,408,419 B2 | 9/2019 | Aieta et al. | |
| 10,416,565 B2 | 9/2019 | Ahmed et al. | |
| 10,435,814 B2 | 10/2019 | Plummer et al. | |
| 10,440,244 B2 | 10/2019 | Rosenblatt et al. | |
| 10,440,300 B2 | 10/2019 | Rephaeli et al. | |
| 10,466,394 B2 | 11/2019 | Lin et al. | |
| 10,468,447 B2 | 11/2019 | Akselrod et al. | |
| 10,481,317 B2 | 11/2019 | Peroz et al. | |
| 10,514,296 B2 | 12/2019 | Han et al. | |
| 10,527,832 B2 | 1/2020 | Schwab et al. | |
| 10,527,851 B2 | 1/2020 | Lin et al. | |
| 10,536,688 B2 | 1/2020 | Haas et al. | |

(56) References Cited

U.S. PATENT DOCUMENTS

| | | |
|---|---|---|
| 10,539,723 B2 | 1/2020 | Iazikov et al. |
| 10,545,323 B2 | 1/2020 | Schwab et al. |
| 10,591,643 B2 | 3/2020 | Lin et al. |
| 10,670,782 B2 | 6/2020 | Arbabi et al. |
| 10,725,290 B2 | 7/2020 | Fan et al. |
| 10,795,168 B2 | 10/2020 | Riley, Jr. et al. |
| 10,816,704 B2 | 10/2020 | Arbabi et al. |
| 10,816,815 B2 | 10/2020 | Aieta et al. |
| 10,915,737 B2 | 2/2021 | Hu et al. |
| 10,916,060 B2 | 2/2021 | West et al. |
| 11,092,717 B2 | 8/2021 | Capasso et al. |
| 11,169,311 B2 | 11/2021 | Rubin et al. |
| 11,231,544 B2 | 1/2022 | Lin et al. |
| 11,298,052 B2 | 4/2022 | Palikaras et al. |
| 11,353,626 B2 | 6/2022 | You et al. |
| 11,366,296 B2 | 6/2022 | Devlin et al. |
| 11,385,104 B2 | 7/2022 | Yao et al. |
| 11,385,516 B2 | 7/2022 | Didomenico |
| 11,578,968 B1 | 2/2023 | Capasso et al. |
| 11,579,456 B2 | 2/2023 | Riley et al. |
| 11,604,364 B2 | 3/2023 | Rubin et al. |
| 11,733,535 B2 | 8/2023 | Aieta et al. |
| 11,815,668 B2 | 11/2023 | Devlin et al. |
| 11,835,680 B2 | 12/2023 | Groever et al. |
| 11,835,681 B2 | 12/2023 | Lin et al. |
| 11,867,937 B2 | 1/2024 | Rubin et al. |
| 12,416,752 B2 | 9/2025 | Rubin et al. |
| 2002/0048727 A1 | 4/2002 | Zhou et al. |
| 2002/0118903 A1 | 8/2002 | Cottrell et al. |
| 2002/0181126 A1 | 12/2002 | Nishioka |
| 2003/0077983 A1 | 4/2003 | Hagan et al. |
| 2003/0107787 A1 | 6/2003 | Bablumyan |
| 2004/0173738 A1 | 9/2004 | Mizuno |
| 2004/0184752 A1 | 9/2004 | Aoki et al. |
| 2004/0190116 A1 | 9/2004 | Lezec et al. |
| 2004/0258128 A1 | 12/2004 | Johs et al. |
| 2005/0151698 A1 | 7/2005 | Mohamadi |
| 2005/0161589 A1 | 7/2005 | Kim et al. |
| 2005/0211665 A1 | 9/2005 | Gao et al. |
| 2005/0220162 A1 | 10/2005 | Nakamura |
| 2005/0239003 A1 | 10/2005 | Chiodini et al. |
| 2006/0042322 A1 | 3/2006 | Mendoza et al. |
| 2006/0127829 A1 | 6/2006 | Deng et al. |
| 2006/0286488 A1 | 12/2006 | Rogers et al. |
| 2007/0024975 A1 | 2/2007 | McGrew |
| 2007/0026585 A1 | 2/2007 | Wong et al. |
| 2007/0030870 A1 | 2/2007 | Bour et al. |
| 2007/0114678 A1 | 5/2007 | Van et al. |
| 2007/0273957 A1 | 11/2007 | Zalevsky et al. |
| 2008/0014632 A1 | 1/2008 | Cunningham et al. |
| 2009/0128908 A1 | 5/2009 | Nakazawa et al. |
| 2009/0135086 A1 | 5/2009 | Fuller et al. |
| 2009/0230333 A1 | 9/2009 | Eleftheriades |
| 2009/0296223 A1 | 12/2009 | Werner et al. |
| 2010/0033701 A1 | 2/2010 | Lee et al. |
| 2010/0055621 A1 | 3/2010 | Hatakeyama et al. |
| 2010/0072170 A1 | 3/2010 | Wu et al. |
| 2010/0091224 A1 | 4/2010 | Cho et al. |
| 2010/0110430 A1 | 5/2010 | Ebbesen et al. |
| 2010/0110433 A1 | 5/2010 | Nedelcu et al. |
| 2010/0134869 A1 | 6/2010 | Bernet et al. |
| 2010/0177164 A1 | 7/2010 | Zalevsky et al. |
| 2010/0187658 A1 | 7/2010 | Wei |
| 2010/0226134 A1 | 9/2010 | Capasso et al. |
| 2010/0232017 A1 | 9/2010 | Mccarthy et al. |
| 2010/0255428 A1 | 10/2010 | Chen et al. |
| 2010/0259804 A1 | 10/2010 | Buschbeck et al. |
| 2011/0012807 A1 | 1/2011 | Sorvala |
| 2011/0019180 A1 | 1/2011 | Kruglick |
| 2011/0102877 A1 | 5/2011 | Parriaux |
| 2011/0149251 A1 | 6/2011 | Duelli |
| 2011/0187577 A1 | 8/2011 | Fuller et al. |
| 2011/0241549 A1* | 10/2011 | Wootton ............ F21S 8/006 |
| | | 257/E33.012 |
| 2011/0261441 A1 | 10/2011 | Zheludev et al. |

| | | |
|---|---|---|
| 2012/0008133 A1 | 1/2012 | Silny et al. |
| 2012/0068347 A1 | 3/2012 | Isobayashi et al. |
| 2012/0092735 A1 | 4/2012 | Futterer et al. |
| 2012/0140235 A1 | 6/2012 | Lee et al. |
| 2012/0258407 A1 | 10/2012 | Sirat |
| 2012/0269483 A1 | 10/2012 | Mossberg et al. |
| 2012/0293854 A1 | 11/2012 | Zheludev et al. |
| 2012/0327666 A1 | 12/2012 | Liu et al. |
| 2012/0328240 A1 | 12/2012 | Ma et al. |
| 2013/0016030 A1 | 1/2013 | Liu et al. |
| 2013/0032949 A1 | 2/2013 | Lin et al. |
| 2013/0037873 A1 | 2/2013 | Suzuki et al. |
| 2013/0050285 A1 | 2/2013 | Takahashi et al. |
| 2013/0058071 A1 | 3/2013 | Ben |
| 2013/0075848 A1 | 3/2013 | Nikolic et al. |
| 2013/0194537 A1 | 8/2013 | Mao et al. |
| 2013/0194787 A1 | 8/2013 | Geske et al. |
| 2013/0208332 A1 | 8/2013 | Yu et al. |
| 2014/0009823 A1 | 1/2014 | Park et al. |
| 2014/0043846 A1 | 2/2014 | Yang et al. |
| 2014/0085693 A1 | 3/2014 | Mosallaei et al. |
| 2014/0210835 A1 | 7/2014 | Hong et al. |
| 2014/0277433 A1 | 9/2014 | Pugh et al. |
| 2015/0011073 A1 | 1/2015 | Lei et al. |
| 2015/0017466 A1 | 1/2015 | Ayon et al. |
| 2015/0055745 A1 | 2/2015 | Holzner et al. |
| 2015/0068599 A1 | 3/2015 | Chou |
| 2015/0090862 A1 | 4/2015 | Matsui et al. |
| 2015/0092139 A1 | 4/2015 | Eguchi |
| 2015/0098002 A1 | 4/2015 | Wang |
| 2015/0116721 A1 | 4/2015 | Kats et al. |
| 2015/0125111 A1 | 5/2015 | Orcutt et al. |
| 2015/0185000 A1 | 7/2015 | Wilson et al. |
| 2015/0185413 A1 | 7/2015 | Greiner et al. |
| 2015/0219497 A1 | 8/2015 | Johs et al. |
| 2015/0219806 A1 | 8/2015 | Arbabi et al. |
| 2015/0241608 A1 | 8/2015 | Shian et al. |
| 2015/0316717 A1 | 11/2015 | Astratov |
| 2016/0025914 A1 | 1/2016 | Brongersma et al. |
| 2016/0037146 A1 | 2/2016 | Mcgrew |
| 2016/0077261 A1 | 3/2016 | Arbabi et al. |
| 2016/0133762 A1 | 5/2016 | Blasco Claret et al. |
| 2016/0161826 A1 | 6/2016 | Shen et al. |
| 2016/0195705 A1 | 7/2016 | Betzig et al. |
| 2016/0253551 A1 | 9/2016 | Pezzaniti et al. |
| 2016/0254638 A1 | 9/2016 | Chen et al. |
| 2016/0276979 A1 | 9/2016 | Shaver et al. |
| 2016/0299337 A1 | 10/2016 | Arbabi et al. |
| 2016/0299426 A1 | 10/2016 | Gates et al. |
| 2016/0306079 A1 | 10/2016 | Arbabi et al. |
| 2016/0306157 A1 | 10/2016 | Rho et al. |
| 2016/0318067 A1 | 11/2016 | Banerjee et al. |
| 2016/0331457 A1 | 11/2016 | Varghese et al. |
| 2016/0341859 A1 | 11/2016 | Shvets et al. |
| 2016/0359235 A1 | 12/2016 | Driscoll et al. |
| 2016/0361002 A1 | 12/2016 | Palikaras et al. |
| 2016/0370568 A1 | 12/2016 | Toussaint et al. |
| 2017/0003169 A1 | 1/2017 | Shaltout et al. |
| 2017/0010466 A1 | 1/2017 | Klug et al. |
| 2017/0030773 A1 | 2/2017 | Han et al. |
| 2017/0038574 A1 | 2/2017 | Zhuang et al. |
| 2017/0045652 A1 | 2/2017 | Arbabi et al. |
| 2017/0082263 A1 | 3/2017 | Byrnes et al. |
| 2017/0090221 A1 | 3/2017 | Atwater |
| 2017/0121843 A1 | 5/2017 | Plummer et al. |
| 2017/0125911 A1 | 5/2017 | Alu et al. |
| 2017/0131460 A1 | 5/2017 | Lin et al. |
| 2017/0146806 A1 | 5/2017 | Lin et al. |
| 2017/0176758 A1 | 6/2017 | Lerner et al. |
| 2017/0186166 A1 | 6/2017 | Grunnet-jepsen et al. |
| 2017/0201658 A1 | 7/2017 | Rosenblatt et al. |
| 2017/0212285 A1 | 7/2017 | Arbabi et al. |
| 2017/0235162 A1 | 8/2017 | Shaltout et al. |
| 2017/0250577 A1 | 8/2017 | Ho et al. |
| 2017/0293141 A1 | 10/2017 | Schowengerdt et al. |
| 2017/0299784 A1 | 10/2017 | Mikkelsen et al. |
| 2017/0310907 A1 | 10/2017 | Wang |
| 2017/0322418 A1 | 11/2017 | Lin et al. |
| 2017/0329201 A1 | 11/2017 | Arnold |

(56) References Cited

U.S. PATENT DOCUMENTS

| | | |
|---|---|---|
| 2017/0374352 A1 | 12/2017 | Horesh |
| 2018/0035101 A1 | 2/2018 | Osterhout |
| 2018/0044234 A1 | 2/2018 | Hokansson et al. |
| 2018/0045953 A1 | 2/2018 | Fan et al. |
| 2018/0052276 A1 | 2/2018 | Klienman et al. |
| 2018/0052320 A1 | 2/2018 | Curtis et al. |
| 2018/0107015 A1 | 4/2018 | Dümpelmann et al. |
| 2018/0109002 A1 | 4/2018 | Foo |
| 2018/0129866 A1 | 5/2018 | Hicks et al. |
| 2018/0184065 A1 | 6/2018 | Zhao et al. |
| 2018/0216797 A1 | 8/2018 | Khorasaninejad et al. |
| 2018/0217395 A1 | 8/2018 | Lin et al. |
| 2018/0231700 A1 | 8/2018 | Ahmed et al. |
| 2018/0231702 A1 | 8/2018 | Lin et al. |
| 2018/0236596 A1 | 8/2018 | Ihlemann et al. |
| 2018/0246262 A1 | 8/2018 | Zhan et al. |
| 2018/0248268 A1 | 8/2018 | Shvets et al. |
| 2018/0252857 A1 | 9/2018 | Glik et al. |
| 2018/0259700 A1 | 9/2018 | Khorasaninejad et al. |
| 2018/0259757 A1 | 9/2018 | Urzhumov |
| 2018/0267605 A1 | 9/2018 | Border |
| 2018/0274750 A1 | 9/2018 | Byrnes et al. |
| 2018/0292644 A1 | 10/2018 | Kamali et al. |
| 2018/0299595 A1 | 10/2018 | Arbabi et al. |
| 2018/0314130 A1 | 11/2018 | Joo et al. |
| 2018/0341090 A1 | 11/2018 | Devlin et al. |
| 2018/0364158 A1 | 12/2018 | Wang et al. |
| 2019/0003892 A1 | 1/2019 | Aieta et al. |
| 2019/0025463 A1 | 1/2019 | She et al. |
| 2019/0025477 A1 | 1/2019 | She et al. |
| 2019/0041642 A1 | 2/2019 | Haddick et al. |
| 2019/0041660 A1* | 2/2019 | Ahmed ................. G02B 27/48 |
| 2019/0041736 A1 | 2/2019 | Grunnet-jepsen et al. |
| 2019/0044003 A1 | 2/2019 | Heck et al. |
| 2019/0049632 A1 | 2/2019 | Shin et al. |
| 2019/0049732 A1 | 2/2019 | Lee et al. |
| 2019/0057512 A1 | 2/2019 | Han et al. |
| 2019/0064532 A1 | 2/2019 | Riley, Jr. et al. |
| 2019/0079321 A1 | 3/2019 | Wu et al. |
| 2019/0086579 A1 | 3/2019 | Kim et al. |
| 2019/0086683 A1 | 3/2019 | Aieta et al. |
| 2019/0101448 A1 | 4/2019 | Lee et al. |
| 2019/0113775 A1 | 4/2019 | Jang et al. |
| 2019/0120817 A1 | 4/2019 | Anderson |
| 2019/0121004 A1 | 4/2019 | Ahmed et al. |
| 2019/0137075 A1 | 5/2019 | Aieta et al. |
| 2019/0137762 A1 | 5/2019 | Hu |
| 2019/0137793 A1 | 5/2019 | Luo et al. |
| 2019/0137856 A1* | 5/2019 | Na ..................... G01B 11/2509 |
| 2019/0154877 A1 | 5/2019 | Capasso et al. |
| 2019/0155302 A1 | 5/2019 | Lukierski et al. |
| 2019/0157830 A1 | 5/2019 | Tong et al. |
| 2019/0162592 A1 | 5/2019 | Khorasaninejad et al. |
| 2019/0170655 A1 | 6/2019 | Smith |
| 2019/0191144 A1 | 6/2019 | Arbabi et al. |
| 2019/0196068 A1 | 6/2019 | Tsai et al. |
| 2019/0206136 A1 | 7/2019 | West et al. |
| 2019/0219835 A1 | 7/2019 | Skinner et al. |
| 2019/0235139 A1 | 8/2019 | Chen et al. |
| 2019/0250107 A1 | 8/2019 | Sreenivasan et al. |
| 2019/0369401 A1 | 12/2019 | Rolland et al. |
| 2019/0371965 A1* | 12/2019 | Na ......................... G06T 7/521 |
| 2019/0377084 A1 | 12/2019 | Sleasman et al. |
| 2019/0386749 A1 | 12/2019 | Lezec et al. |
| 2019/0391378 A1 | 12/2019 | Eichelkraut et al. |
| 2020/0025888 A1 | 1/2020 | Jang et al. |
| 2020/0052027 A1 | 2/2020 | Arbabi et al. |
| 2020/0076163 A1 | 3/2020 | Han et al. |
| 2020/0083666 A1 | 3/2020 | Fallahi et al. |
| 2020/0096672 A1 | 3/2020 | Yu et al. |
| 2020/0150311 A1 | 5/2020 | Zhang et al. |
| 2020/0225386 A1 | 7/2020 | Tsai et al. |
| 2020/0236315 A1 | 7/2020 | Kimura |
| 2020/0249429 A1 | 8/2020 | Han et al. |
| 2020/0271941 A1 | 8/2020 | Riley, Jr. et al. |
| 2020/0272100 A1 | 8/2020 | Yu et al. |
| 2020/0284960 A1 | 9/2020 | Ellenbogen et al. |
| 2020/0355913 A1 | 11/2020 | Park et al. |
| 2021/0010928 A1 | 1/2021 | Acher et al. |
| 2021/0028215 A1 | 1/2021 | Devlin et al. |
| 2021/0048569 A1 | 2/2021 | Rubin et al. |
| 2021/0082886 A1* | 3/2021 | Brick ................ H10H 20/8514 |
| 2021/0109364 A1 | 4/2021 | Aieta et al. |
| 2021/0112201 A1 | 4/2021 | Cho et al. |
| 2021/0149081 A1 | 5/2021 | Groever et al. |
| 2021/0190593 A1 | 6/2021 | Yao |
| 2021/0200992 A1* | 7/2021 | Padmanabhan ...... G06V 40/165 |
| 2021/0208469 A1 | 7/2021 | Didomenico |
| 2021/0263329 A1 | 8/2021 | Latawiec |
| 2021/0286188 A1 | 9/2021 | Rubin et al. |
| 2021/0288095 A1 | 9/2021 | Delga et al. |
| 2021/0302763 A1 | 9/2021 | Yao et al. |
| 2021/0311588 A1 | 10/2021 | Han et al. |
| 2021/0318466 A1 | 10/2021 | Uenoyama et al. |
| 2021/0333150 A1 | 10/2021 | McEldowney et al. |
| 2022/0050294 A1 | 2/2022 | Fermigier et al. |
| 2022/0052093 A1 | 2/2022 | Devlin et al. |
| 2022/0091428 A1 | 3/2022 | Riley, Jr. et al. |
| 2022/0107263 A1 | 4/2022 | Biesinger et al. |
| 2022/0206186 A1 | 6/2022 | Chen et al. |
| 2022/0206205 A1 | 6/2022 | Rubin et al. |
| 2022/0214219 A1 | 7/2022 | Faraon et al. |
| 2022/0244442 A1 | 8/2022 | Rubin et al. |
| 2022/0283411 A1 | 9/2022 | Devlin et al. |
| 2023/0194883 A1 | 6/2023 | Riley et al. |
| 2023/0208104 A1 | 6/2023 | Tamagnone et al. |
| 2023/0280498 A1 | 9/2023 | Altuzarra et al. |
| 2023/0288716 A1 | 9/2023 | Rubin et al. |
| 2023/0314827 A1 | 10/2023 | Devlin et al. |
| 2023/0318261 A1 | 10/2023 | Tamagnone et al. |
| 2024/0085533 A1* | 3/2024 | Antoun ................ G01S 7/4868 |
| 2024/0142686 A1 | 5/2024 | Rubin et al. |
| 2024/0210246 A1 | 6/2024 | Rubin et al. |

FOREIGN PATENT DOCUMENTS

| | | |
|---|---|---|
| CA | 3064764 A1 | 11/2018 |
| CA | 110376665 B | 8/2021 |
| CA | 213902664 U | 8/2021 |
| CA | 114176492 A | 3/2022 |
| CA | 217639773 U | 10/2022 |
| CA | 217885960 U | 11/2022 |
| CA | 217982038 U | 12/2022 |
| CN | 1044991 A | 8/1990 |
| CN | 101158727 A | 4/2008 |
| CN | 101164147 A | 4/2008 |
| CN | 100476504 C | 4/2009 |
| CN | 101546002 A | 9/2009 |
| CN | 101681095 A | 3/2010 |
| CN | 101510013 B | 6/2010 |
| CN | 101510012 B | 8/2010 |
| CN | 101510011 B | 9/2010 |
| CN | 101241173 B | 8/2011 |
| CN | 202854395 U | 4/2013 |
| CN | 103092049 A | 5/2013 |
| CN | 203799117 U | 8/2014 |
| CN | 104067171 A | 9/2014 |
| CN | 104374745 A | 2/2015 |
| CN | 204422813 U | 6/2015 |
| CN | 104932043 A | 9/2015 |
| CN | 104956491 A | 9/2015 |
| CN | 204719330 U | 10/2015 |
| CN | 105068396 A | 11/2015 |
| CN | 103869484 B | 1/2016 |
| CN | 105223689 A | 1/2016 |
| CN | 105278026 A | 1/2016 |
| CN | 105278309 A | 1/2016 |
| CN | 105655286 A | 6/2016 |
| CN | 105676314 A | 6/2016 |
| CN | 105917277 A | 8/2016 |
| CN | 105974503 A | 9/2016 |
| CN | 103257441 B | 10/2016 |
| CN | 205620619 U | 10/2016 |
| CN | 104834079 B | 4/2017 |

(56) References Cited

FOREIGN PATENT DOCUMENTS

| | | | |
|---|---|---|---|
| CN | 106611699 | A | 5/2017 |
| CN | 104834089 | B | 6/2017 |
| CN | 106848555 | A | 6/2017 |
| CN | 106200276 | B | 10/2017 |
| CN | 104834088 | B | 12/2017 |
| CN | 105676314 | B | 1/2018 |
| CN | 107561857 | A | 1/2018 |
| CN | 108089325 | A | 5/2018 |
| CN | 108291983 | A | 7/2018 |
| CN | 207623619 | U | 7/2018 |
| CN | 106199997 | B | 8/2018 |
| CN | 108474869 | A | 8/2018 |
| CN | 108507542 | A | 9/2018 |
| CN | 207923075 | U | 9/2018 |
| CN | 108680544 | A | 10/2018 |
| CN | 108761779 | A | 11/2018 |
| CN | 109000692 | A | 12/2018 |
| CN | 208270846 | U | 12/2018 |
| CN | 109196387 | A | 1/2019 |
| CN | 208421387 | U | 1/2019 |
| CN | 106199956 | B | 2/2019 |
| CN | 109360139 | A | 2/2019 |
| CN | 106950195 | B | 5/2019 |
| CN | 106324832 | B | 7/2019 |
| CN | 106526730 | B | 7/2019 |
| CN | 106485761 | B | 8/2019 |
| CN | 110160685 | A | 8/2019 |
| CN | 110678773 | A | 1/2020 |
| CN | 108474869 | B | 6/2020 |
| CN | 111316138 | A | 6/2020 |
| CN | 111580190 | A | 8/2020 |
| CN | 111656707 | A | 9/2020 |
| CN | 111819489 | A | 10/2020 |
| CN | 213092332 | U | 4/2021 |
| CN | 113050295 | A | 6/2021 |
| CN | 113168022 | A | 7/2021 |
| CN | 213903843 | U | 8/2021 |
| CN | 214098104 | U | 8/2021 |
| CN | 113703080 | A | 11/2021 |
| CN | 111580190 | B | 12/2021 |
| CN | 113791524 | A | 12/2021 |
| CN | 113807312 | A | 12/2021 |
| CN | 113820839 | A | 12/2021 |
| CN | 113834568 | A | 12/2021 |
| CN | 113835227 | A | 12/2021 |
| CN | 113851573 | A | 12/2021 |
| CN | 215005942 | U | 12/2021 |
| CN | 215010478 | U | 12/2021 |
| CN | 110494771 | B | 1/2022 |
| CN | 113885106 | A | 1/2022 |
| CN | 113899451 | A | 1/2022 |
| CN | 113900078 | A | 1/2022 |
| CN | 113900162 | A | 1/2022 |
| CN | 113906320 | A | 1/2022 |
| CN | 113917574 | A | 1/2022 |
| CN | 113917578 | A | 1/2022 |
| CN | 113934004 | A | 1/2022 |
| CN | 113934005 | A | 1/2022 |
| CN | 113959984 | A | 1/2022 |
| CN | 114002707 | A | 2/2022 |
| CN | 114019589 | A | 2/2022 |
| CN | 114047632 | A | 2/2022 |
| CN | 114047637 | A | 2/2022 |
| CN | 114112058 | A | 3/2022 |
| CN | 114156168 | A | 3/2022 |
| CN | 215932365 | U | 3/2022 |
| CN | 114280704 | A | 4/2022 |
| CN | 114280716 | A | 4/2022 |
| CN | 114286953 | A | 4/2022 |
| CN | 114296180 | A | 4/2022 |
| CN | 114325886 | A | 4/2022 |
| CN | 114326163 | A | 4/2022 |
| CN | 114354141 | A | 4/2022 |
| CN | 114373825 | A | 4/2022 |
| CN | 114384612 | A | 4/2022 |
| CN | 114397092 | A | 4/2022 |
| CN | 114397718 | A | 4/2022 |
| CN | 114415386 | A | 4/2022 |
| CN | 216345776 | U | 4/2022 |
| CN | 216351311 | U | 4/2022 |
| CN | 216351591 | U | 4/2022 |
| CN | 216355281 | U | 4/2022 |
| CN | 216361353 | U | 4/2022 |
| CN | 111316138 | B | 5/2022 |
| CN | 114488365 | A | 5/2022 |
| CN | 114543993 | A | 5/2022 |
| CN | 114545367 | A | 5/2022 |
| CN | 114545370 | A | 5/2022 |
| CN | 114554062 | A | 5/2022 |
| CN | 114561266 | A | 5/2022 |
| CN | 216593224 | U | 5/2022 |
| CN | 216605227 | U | 5/2022 |
| CN | 216622749 | U | 5/2022 |
| CN | 114578642 | A | 6/2022 |
| CN | 114593689 | A | 6/2022 |
| CN | 114623960 | A | 6/2022 |
| CN | 114624878 | A | 6/2022 |
| CN | 114660683 | A | 6/2022 |
| CN | 114660780 | A | 6/2022 |
| CN | 114690387 | A | 7/2022 |
| CN | 114740631 | A | 7/2022 |
| CN | 114743714 | A | 7/2022 |
| CN | 114779437 | A | 7/2022 |
| CN | 216896898 | U | 7/2022 |
| CN | 216900930 | U | 7/2022 |
| CN | 216901121 | U | 7/2022 |
| CN | 216901165 | U | 7/2022 |
| CN | 216901317 | U | 7/2022 |
| CN | 216901952 | U | 7/2022 |
| CN | 216903719 | U | 7/2022 |
| CN | 216933177 | U | 7/2022 |
| CN | 217034311 | U | 7/2022 |
| CN | 217034418 | U | 7/2022 |
| CN | 217034466 | U | 7/2022 |
| CN | 114859446 | A | 8/2022 |
| CN | 114859447 | A | 8/2022 |
| CN | 114859570 | A | 8/2022 |
| CN | 114935741 | A | 8/2022 |
| CN | 217276608 | U | 8/2022 |
| CN | 217278911 | U | 8/2022 |
| CN | 217278915 | U | 8/2022 |
| CN | 217278989 | U | 8/2022 |
| CN | 217279003 | U | 8/2022 |
| CN | 217279087 | U | 8/2022 |
| CN | 217279110 | U | 8/2022 |
| CN | 217279168 | U | 8/2022 |
| CN | 217279244 | U | 8/2022 |
| CN | 217280797 | U | 8/2022 |
| CN | 217280851 | U | 8/2022 |
| CN | 217281621 | U | 8/2022 |
| CN | 217281623 | U | 8/2022 |
| CN | 114995038 | A | 9/2022 |
| CN | 115016099 | A | 9/2022 |
| CN | 115016150 | A | 9/2022 |
| CN | 115032766 | A | 9/2022 |
| CN | 115047432 | A | 9/2022 |
| CN | 115047548 | A | 9/2022 |
| CN | 115047653 | A | 9/2022 |
| CN | 115061114 | A | 9/2022 |
| CN | 115079415 | A | 9/2022 |
| CN | 115113174 | A | 9/2022 |
| CN | 217456368 | U | 9/2022 |
| CN | 217465697 | U | 9/2022 |
| CN | 217466052 | U | 9/2022 |
| CN | 217466667 | U | 9/2022 |
| CN | 217467162 | U | 9/2022 |
| CN | 217467176 | U | 9/2022 |
| CN | 217467177 | U | 9/2022 |
| CN | 217467226 | U | 9/2022 |
| CN | 217467326 | U | 9/2022 |
| CN | 217467327 | U | 9/2022 |
| CN | 217467336 | U | 9/2022 |
| CN | 217467338 | U | 9/2022 |
| CN | 217467351 | U | 9/2022 |

(56) References Cited

FOREIGN PATENT DOCUMENTS

| | | | |
|---|---|---|---|
| CN | 217467352 U | 9/2022 |
| CN | 217467353 U | 9/2022 |
| CN | 217467355 U | 9/2022 |
| CN | 217467357 U | 9/2022 |
| CN | 217467358 U | 9/2022 |
| CN | 217467363 U | 9/2022 |
| CN | 217467364 U | 9/2022 |
| CN | 217467367 U | 9/2022 |
| CN | 217467368 U | 9/2022 |
| CN | 217467395 U | 9/2022 |
| CN | 217467396 U | 9/2022 |
| CN | 217467399 U | 9/2022 |
| CN | 217467439 U | 9/2022 |
| CN | 217467452 U | 9/2022 |
| CN | 115164714 A | 10/2022 |
| CN | 115166876 A | 10/2022 |
| CN | 115166958 A | 10/2022 |
| CN | 115185082 A | 10/2022 |
| CN | 115211799 A | 10/2022 |
| CN | 115236795 A | 10/2022 |
| CN | 217639515 U | 10/2022 |
| CN | 217639519 U | 10/2022 |
| CN | 217639539 U | 10/2022 |
| CN | 217639544 U | 10/2022 |
| CN | 217639611 U | 10/2022 |
| CN | 217639612 U | 10/2022 |
| CN | 217639613 U | 10/2022 |
| CN | 217639715 U | 10/2022 |
| CN | 217639718 U | 10/2022 |
| CN | 217639719 U | 10/2022 |
| CN | 217639720 U | 10/2022 |
| CN | 217639722 U | 10/2022 |
| CN | 217639723 U | 10/2022 |
| CN | 217639724 U | 10/2022 |
| CN | 217639725 U | 10/2022 |
| CN | 217639726 U | 10/2022 |
| CN | 217639763 U | 10/2022 |
| CN | 217639765 U | 10/2022 |
| CN | 217639767 U | 10/2022 |
| CN | 217639768 U | 10/2022 |
| CN | 217639769 U | 10/2022 |
| CN | 217639770 U | 10/2022 |
| CN | 217639771 U | 10/2022 |
| CN | 217639772 U | 10/2022 |
| CN | 217639774 U | 10/2022 |
| CN | 217639776 U | 10/2022 |
| CN | 217639777 U | 10/2022 |
| CN | 217639778 U | 10/2022 |
| CN | 217639903 U | 10/2022 |
| CN | 217639920 U | 10/2022 |
| CN | 115268058 A | 11/2022 |
| CN | 115327865 A | 11/2022 |
| CN | 115332917 A | 11/2022 |
| CN | 115343795 A | 11/2022 |
| CN | 115390176 A | 11/2022 |
| CN | 217809433 U | 11/2022 |
| CN | 217818613 U | 11/2022 |
| CN | 217819022 U | 11/2022 |
| CN | 217820828 U | 11/2022 |
| CN | 217820829 U | 11/2022 |
| CN | 217820831 U | 11/2022 |
| CN | 217820834 U | 11/2022 |
| CN | 217820838 U | 11/2022 |
| CN | 217820839 U | 11/2022 |
| CN | 217820840 U | 11/2022 |
| CN | 217820943 U | 11/2022 |
| CN | 217820944 U | 11/2022 |
| CN | 217820945 U | 11/2022 |
| CN | 217820971 U | 11/2022 |
| CN | 217821058 U | 11/2022 |
| CN | 217821068 U | 11/2022 |
| CN | 217821071 U | 11/2022 |
| CN | 217821091 U | 11/2022 |
| CN | 217821110 U | 11/2022 |
| CN | 217821111 U | 11/2022 |
| CN | 217821113 U | 11/2022 |
| CN | 217821122 U | 11/2022 |
| CN | 217821160 U | 11/2022 |
| CN | 217821236 U | 11/2022 |
| CN | 217821680 U | 11/2022 |
| CN | 217821696 U | 11/2022 |
| CN | 217822825 U | 11/2022 |
| CN | 217823690 U | 11/2022 |
| CN | 217825178 U | 11/2022 |
| CN | 217902220 U | 11/2022 |
| CN | 217902222 U | 11/2022 |
| CN | 115421295 A | 12/2022 |
| CN | 115453754 A | 12/2022 |
| CN | 115524768 A | 12/2022 |
| CN | 115524775 A | 12/2022 |
| CN | 115524874 A | 12/2022 |
| CN | 217981833 U | 12/2022 |
| CN | 217981857 U | 12/2022 |
| CN | 217981991 U | 12/2022 |
| CN | 217981992 U | 12/2022 |
| CN | 217982020 U | 12/2022 |
| CN | 217982089 U | 12/2022 |
| CN | 217982120 U | 12/2022 |
| CN | 217983382 U | 12/2022 |
| CN | 217984044 U | 12/2022 |
| CN | 115812169 A | 3/2023 |
| CN | 116745685 A | 9/2023 |
| CN | 118295056 A | 7/2024 |
| CN | 118591827 A | 9/2024 |
| DE | 102007058558 A1 | 6/2009 |
| DE | 102009037629 A1 | 2/2011 |
| DE | 102012212753 A1 | 1/2014 |
| DE | 102015221985 A1 | 5/2017 |
| DE | 102016218996 A1 | 9/2017 |
| DE | 112018002811 T5 | 2/2020 |
| DE | 112018002670 T5 | 3/2020 |
| EP | 1251397 A2 | 10/2002 |
| EP | 1252623 B1 | 10/2004 |
| EP | 2631740 A2 | 8/2013 |
| EP | 2763519 A2 | 8/2014 |
| EP | 2338114 B1 | 3/2017 |
| EP | 3226042 A1 | 10/2017 |
| EP | 3353578 A1 | 8/2018 |
| EP | 3380876 A1 | 10/2018 |
| EP | 3385770 A1 | 10/2018 |
| EP | 3440484 A1 | 2/2019 |
| EP | 3504566 A2 | 7/2019 |
| EP | 3631533 A1 | 4/2020 |
| EP | 3676973 A1 | 7/2020 |
| EP | 3743764 A1 | 12/2020 |
| EP | 3353578 B1 | 1/2021 |
| EP | 3799626 A1 | 4/2021 |
| EP | 3956702 A1 | 2/2022 |
| EP | 4004608 A1 | 6/2022 |
| EP | 4147311 A1 | 3/2023 |
| EP | 4268009 A1 | 11/2023 |
| EP | 4449372 A1 | 10/2024 |
| GB | 2490895 A | 11/2012 |
| GB | 2499869 B | 3/2018 |
| GB | 2578049 A | 4/2020 |
| GB | 2578233 A | 4/2020 |
| GB | 2578236 A | 4/2020 |
| GB | 2578236 B | 11/2022 |
| HK | 40010538 | 7/2020 |
| JP | 2004302457 A | 10/2004 |
| JP | 2005017408 A | 1/2005 |
| JP | 2005274847 A | 10/2005 |
| JP | 2008046428 A | 2/2008 |
| JP | 2008299084 A | 12/2008 |
| JP | 2010085977 A | 4/2010 |
| JP | 2015502581 A | 1/2015 |
| JP | 2015092234 A | 5/2015 |
| JP | 2016511936 A | 4/2016 |
| JP | 2017062373 A | 3/2017 |
| JP | 2018536204 A | 12/2018 |
| JP | 2018537804 A | 12/2018 |
| JP | 2019516128 A | 6/2019 |
| JP | 2020522009 A | 7/2020 |
| JP | 2021511553 A | 5/2021 |

(56) References Cited

FOREIGN PATENT DOCUMENTS

| JP | 6925358 | B2 | 8/2021 |
| JP | 2022542172 | A | 9/2022 |
| JP | 2025500275 | A | 1/2025 |
| KR | 0144569 | B1 | 11/1998 |
| KR | 20080099452 | A | 11/2008 |
| KR | 20080103149 | A | 11/2008 |
| KR | 20090002583 | A | 1/2009 |
| KR | 20100027995 | A | 3/2010 |
| KR | 101493928 | B1 | 3/2015 |
| KR | 20150113041 | A | 10/2015 |
| KR | 20170015109 | A | 2/2017 |
| KR | 20180083885 | A | 7/2018 |
| KR | 20180121309 | A | 11/2018 |
| KR | 20180124106 | A | 11/2018 |
| KR | 101905444 | B1 | 12/2018 |
| KR | 20190038221 | A | 4/2019 |
| KR | 102036640 | B1 | 10/2019 |
| KR | 1020200008630 | A | 1/2020 |
| KR | 1020200108901 | A | 9/2020 |
| KR | 20210088520 | A | 7/2021 |
| KR | 102363805 | B1 | 2/2022 |
| KR | 1020220035971 | A | 3/2022 |
| KR | 20240121833 | A | 8/2024 |
| KR | 102763012 | B1 | 1/2025 |
| SG | 11201804346 | P | 11/2021 |
| SG | 11201808772 | W | 11/2021 |
| SG | 11202001717 | | 2/2023 |
| SG | 11202006952X | | 2/2023 |
| TW | 201017338 | A | 5/2010 |
| TW | 201438242 | A | 10/2014 |
| TW | 201908232 | A | 3/2019 |
| WO | 2000043750 | A2 | 7/2000 |
| WO | 2007141788 | A2 | 12/2007 |
| WO | 2008019803 | A1 | 2/2008 |
| WO | 2008020899 | A2 | 2/2008 |
| WO | 2009067540 | A1 | 5/2009 |
| WO | 2009124181 | A2 | 10/2009 |
| WO | 2011106553 | A2 | 9/2011 |
| WO | 2011106553 | A3 | 1/2012 |
| WO | 2012122677 | A1 | 9/2012 |
| WO | 2012139634 | A1 | 10/2012 |
| WO | 2012144997 | A1 | 10/2012 |
| WO | 2012172366 | A1 | 12/2012 |
| WO | 2013033591 | A1 | 3/2013 |
| WO | 2014116500 | A1 | 7/2014 |
| WO | 2015021255 | A1 | 2/2015 |
| WO | 2015077926 | A1 | 6/2015 |
| WO | 2015112939 | A1 | 7/2015 |
| WO | 2015160412 | A2 | 10/2015 |
| WO | 2016049629 | A1 | 3/2016 |
| WO | 2016051325 | A1 | 4/2016 |
| WO | 2016086204 | A1 | 6/2016 |
| WO | 2016140720 | A2 | 9/2016 |
| WO | 2016140720 | A3 | 10/2016 |
| WO | 2016168173 | A1 | 10/2016 |
| WO | 2016178740 | A2 | 11/2016 |
| WO | 2016191142 | A2 | 12/2016 |
| WO | 2017005709 | A1 | 1/2017 |
| WO | 2017034995 | A1 | 3/2017 |
| WO | 2017040854 | A1 | 3/2017 |
| WO | 2017053309 | A1 | 3/2017 |
| WO | 2017079480 | A1 | 5/2017 |
| WO | 2017091738 | A1 | 6/2017 |
| WO | 2017176921 | A1 | 10/2017 |
| WO | 2017182771 | A1 | 10/2017 |
| WO | 2018063455 | A1 | 4/2018 |
| WO | 2018067246 | A2 | 4/2018 |
| WO | 2018063455 | A9 | 5/2018 |
| WO | 2018118984 | A1 | 6/2018 |
| WO | 2018134215 | A1 | 7/2018 |
| WO | 2018067246 | A3 | 8/2018 |
| WO | 2018142339 | A1 | 8/2018 |
| WO | 2018204856 | A1 | 11/2018 |
| WO | 2018218063 | A1 | 11/2018 |
| WO | 2018219710 | A1 | 12/2018 |
| WO | 2018222944 | A1 | 12/2018 |
| WO | 2019015735 | A1 | 1/2019 |
| WO | 2019039241 | A1 | 2/2019 |
| WO | 2019043016 | A1 | 3/2019 |
| WO | 2019046827 | A1 | 3/2019 |
| WO | 2019057907 | A1 | 3/2019 |
| WO | 2019075335 | A1 | 4/2019 |
| WO | 2019101750 | A2 | 5/2019 |
| WO | 2019103762 | A2 | 5/2019 |
| WO | 2019108290 | A1 | 6/2019 |
| WO | 2019113106 | A1 | 6/2019 |
| WO | 2019116364 | A1 | 6/2019 |
| WO | 2019118646 | A1 | 6/2019 |
| WO | 2019119025 | A1 | 6/2019 |
| WO | 2019103762 | A3 | 7/2019 |
| WO | 2019136166 | A1 | 7/2019 |
| WO | 2019103762 | A9 | 8/2019 |
| WO | 2019147828 | A1 | 8/2019 |
| WO | 2019148200 | A1 | 8/2019 |
| WO | 2019164542 | A1 | 8/2019 |
| WO | 2019164849 | A1 | 8/2019 |
| WO | 2019173357 | A1 | 9/2019 |
| WO | 2019198568 | A1 | 10/2019 |
| WO | 2019203876 | A2 | 10/2019 |
| WO | 2019204667 | A1 | 10/2019 |
| WO | 2019206430 | A1 | 10/2019 |
| WO | 2020001938 | A1 | 1/2020 |
| WO | 2020010084 | A1 | 1/2020 |
| WO | 2020101568 | A1 | 5/2020 |
| WO | 2020139752 | A1 | 7/2020 |
| WO | 2020176227 | A1 | 9/2020 |
| WO | 2020214615 | A1 | 10/2020 |
| WO | 2020214617 | A1 | 10/2020 |
| WO | 2020248046 | A1 | 12/2020 |
| WO | 2021021671 | A1 | 2/2021 |
| WO | 2021130085 | A1 | 7/2021 |
| WO | 2021226544 | A1 | 11/2021 |
| WO | 2021230868 | A1 | 11/2021 |
| WO | 2022146929 | A1 | 7/2022 |
| WO | 2022150816 | A1 | 7/2022 |
| WO | WO-2022211272 | A1 * | 10/2022 .......... A61B 5/1116 |
| WO | 2023115037 | A1 | 6/2023 |

OTHER PUBLICATIONS

Extended European Search Report for European Application No. 16869282.0, Search completed Nov. 8, 2019, Mailed Nov. 20, 2019, 15 pgs.

Extended European Search Report for European Application No. 17779772.7, Search completed Oct. 15, 2019, Mailed Oct. 25, 2019, 10 pgs.

Extended European Search Report for European Application No. 17858861.2, Search completed Mar. 13, 2020, Mailed Mar. 23, 2020, 9 pgs.

Extended European Search Report for European Application No. 18805669.1, Search completed Feb. 9, 2021, Mailed Feb. 18, 2021, 13 pgs.

Extended European Search Report for European Application No. 18852460.7, Search completed Mar. 25, 2021, Mailed Apr. 6, 2021, 13 pgs.

Extended European Search Report for European Application No. 19744012.6, Search completed Sep. 3, 2021, Mailed Dec. 16, 2021, 10 pgs.

Extended European Search Report for European Application No. 19830958.5, Search completed Feb. 17, 2022, Mailed Feb. 25, 2022, 8 pgs.

Extended European Search Report for European Application No. 20790964.9, Search completed Nov. 22, 2022, Mailed Dec. 2, 2022, 10 pgs.

Extended European Search Report for European Application No. 20847649.9, Search completed Jul. 20, 2023, Mailed Aug. 1, 2023, 11 pgs.

Moreno et al., "Jones matrix treatment for optical Fourier processors with structured polarization", Optics Express, vol. 19, No. 5, Feb. 28, 2011, pp. 4583-4594, XP055953438, doi: 10.1364/OE.19.004583.

(56)　　　　　References Cited

OTHER PUBLICATIONS

Moreno et al., "Jones matrix treatment for polarization Fourier optics", Journal of Modern Optics, vol. 51, No. 14, Sep. 20, 2004, pp. 2031-2038, doi: 10.1080/09500340408232511.

Mueller et al., "Metasurface Polarization Optics: Independent Phase Control of Arbitrary Orthogonal States of Polarization", Physical Review Letters, vol. 118, No. 11, Mar. 14, 2017, pp. 113901-1-113901-5, doi: 10.1103/PhysRevLett.118.113901.

Mueller et al., "Ultracompact metasurface in-line polarimeter", Optica, vol. 3, No. 1, Jan. 8, 2016, pp. 42-47, doi: 10.1364/OPTICA.3.000042.

Ni et al., "Broadband Light Bending with Plasmonic Nanoantennas", Sciencexpress, vol. 335, No. 6067, Dec. 22, 2011, p. 427, doi: 10.1126/science.1214686.

Ni et al., "Ultra-thin, planar, Babinet-inverted plasmonic metalenses", Light: Science & Applications, vol. 2, No. e72, Apr. 26, 2013, pp. 1-6, doi: 10.1038/lsa.2013.28.

Nikolova et al., "Polarization Holography", Bulgarian Academy of Sciences, Sofia, P. S. Ramanujam, Technical University of Denmark, Roskilde Cambridge University, Aug. 2009, 266 pgs.

Nordin et al., "Micropolarizer array for infrared imaging polarimetry", Journal of the Optical Society of America A, vol. 16, No. 5, May 1999, pp. 1168-1174, doi: 10.1364/JOSAA.16.001168.

Novikova et al., "Polarimetric Imaging for Cancer Diagnosis and Staging", Optics and Photonics News, vol. 23, No. 10, Oct. 2012, pp. 26-33, doi: 10.1364/OPN.23.10.000026.

Oh et al., "Achromatic diffraction from polarization gratings with high efficiency", Optic Letters, vol. 33, No. 20, Oct. 15, 2008, pp. 2287-2289, doi: 10.1364/ol.33.002287.

Okaya et al., "The Dielectric Microwave Resonator", Proceedings of the IRE, vol. 50, No. 10, Oct. 1962, pp. 2081-2092, doi: 10.1109/JRPROC.1962.288245.

Orazbayev et al., "Tunable beam steering enabled by graphene metamaterials", Optics Express, vol. 24, No. 8, Apr. 18, 2016, pp. 8848-8861, doi: 10.1364/OE.24.008848.

Otten et al., "Vector Apodizing Phase Plate coronagraph: prototyping, characterization and outlook", Proceedings of SPIE, Advances in Optical and Mechanical Technologies for Telescopes and Instrumentation, vol. 9151, Sep. 26, 2014, pp. 91511R-1-91511R-10, doi: 10.1117/12.2056096.

Pacheco-Peña et al., "Epsilon-near-zero metalenses operating in the visible", Optics & Laser Technology, vol. 80, Jun. 2016, pp. 162-168, doi: 10.1016/j.optlastec.2016.01.009.

Peinado et al., "Optimization and performance criteria of a Stokes polarimeter based on two variable retarders", Optics Express, vol. 18, No. 10, May 10, 2010, pp. 9815-9830, doi: 10.1364/OE.18.009815.

Petosa, "An Overview of Tuning Techniques for Frequency-Agile Antennas", IEEE Antennas and Propagation Magazine, vol. 54, No. 5, Oct. 2012, pp. 271-296, doi: 10.1109/MAP.2012.6348178.

Pfeiffer et al., "Cascaded metasurfaces for complete phase and polarization control", Applied Physics Letters, vol. 102, No. 23, Jun. 11, 2013, pp. 231116-1-231116-4, doi: 10.1063/1.4810873.

Pfeiffer et al., "Metamaterial Huygens' Surface: Tailoring Wave Fronts with Reflectionless Sheets", Physical Review Letters, vol. 110, No. 197401, May 10, 2013, pp. 197401-1-197401-5, doi: 10.1103/PhysRevLett. 110.197401.

Pierangelo et al., "Polarimetric imaging of uterine cervix: a case study", Optics Express, vol. 21, No. 12, Jun. 17, 2013, pp. 14120-14130, doi: 10.1364/OE.21.014120.

Pors et al., "Broadband Focusing Flat Mirrors Based on Plasmonic Gradient Metasurfaces", Nano Letters, vol. 13, No. 2, Jan. 23, 2013, pp. 829-834, doi: 10.1021/nl304761m.

Pors et al., "Plasmonic metagratings for simultaneous determination of Stokes parameters", Optica, vol. 2, No. 8, Aug. 2015, pp. 716-723, doi: 10.1364/OPTICA.2.000716.

Pors et al., "Waveguide Metacouplers for In-Plane Polarimetry", Physical Review Applied, vol. 5, No. 064015, Jun. 27, 2016, pp. 064015-1-064015-9, doi: 10.1103/PhysRevApplied.5.064015.

Rahmann et al., "Reconstruction of specular surfaces using polarization imaging", IEEE Computer Society Conference on Computer Vision and Pattern Recognition. (CVPR), 2001, pp. I-149-1-155, doi: 10.1109/CVPR.2001.990468.

Ramos et al., "Error propagation in polarimetric demodulation", Applied Optics, vol. 47, No. 14, May 10, 2008, pp. 2541-2549, doi: 10.1364/AO.47.002541.

Redding et al., "Full-field interferometric confocal microscopy using a VCSEL array", Optics Letters, vol. 39, No. 15, Aug. 1, 2014, pp. 4446-4449, doi: 10.1364/OL.39.004446.

Reichelt et al., "Capabilities of diffractive optical elements for real-time holographic displays", Proceedings of SPIE, Practical Holography XXII: Materials and Applications, vol. 6912, Feb. 2008, pp. 69120-69130, doi: 10.1117/12.762887.

Romero et al., "Theory of optimal beam splitting by phase gratings. II. Square and hexagonal gratings", Journal of the Optical Society of America A, vol. 24, No. 8, Aug. 2007, pp. 2296-2312, doi: 10.1364/JOSAA.24.002296.

Rosales-Guzman et al., "How to Shape Light with Spatial Light Modulators", SPIE, 2017, 58 pgs.

Roy et al., "Sub-wavelength focusing meta-lens", Optics Express, vol. 21, No. 6, Mar. 19, 2013, pp. 7577-7582, doi: 10.1364/OE.21.007577.

Rubin et al., "Matrix Fourier optics enables a compact full-Stokes polarization camera", Science, vol. 365, No. 6448, Jul. 5, 2019, pp. 1-8, doi: 10.1126/science.aax1839.

Rubin et al., "Polarization state generation and measurement with a single metasurface", Optics Express, vol. 26, No. 17, Aug. 20, 2018, pp. 21455-21478, doi: 10.1364/OE.26.021455.

Sabatke et al., "Optimization of retardance for a complete Stokes polarimeter", Optics Letters, vol. 25, No. 11, Jun. 1, 2000, pp. 802-804, doi: 10.1364/OL.25.000802.

Saeidi et al., "Wideband plasmonic focusing metasurfaces", Applied Physics Letters, vol. 105, No. 053107, Aug. 2014, pp. 053107-1-053107-4, doi: 10.1063/1.4892560.

Sales et al., "Diffractive-refractive behavior of kinoform lenses", Applied Optics, vol. 36, No. 1, Jan. 1, 1997, pp. 253-257, doi: 10.1364/AO.36.000253.

Sancho-Parramon et al., "Optical characterization of HfO2 by spectroscopic ellipsometry: Dispersion models and direct data inversion", Thin Solid Films, vol. 516, No. 22, Sep. 30, 2008, pp. 7990-7995, doi: 10.1016/j.tsf.2008.04.007.

Sayyah et al., "Two-dimensional pseudo-random optical phased array based on tandem optical injection locking of vertical cavity surface emitting lasers", Optics Express, vol. 23, No. 15, Jul. 27, 2015, pp. 19405-19416, doi: 10.1364/OE.23.019405.

Schulz et al., "Quantifying the impact of proximity error correction on plasmonic metasurfaces", Optical Materials Express, vol. 5, No. 12, Dec. 1, 2015, pp. 2798-2803, doi: 10.1364/OME.5.002798.

Sell et al., "Periodic Dielectric Metasurfaces with High-Efficiency, Multiwavelength Functionalities", Advanced Optical Materials, vol. 5, No. 23, Article 1700645, Dec. 1, 2017, 7 pgs., doi: 10.1002/adom.201700645.

Seurin et al., "High-efficiency VCSEL arrays for illumination and sensing in consumer applications", Proceedings of SPIE, Vertical-Cavity Surface-Emitting Lasers XX, vol. 9766, 2016, pp. 97660D-1-97660D-9, doi: 10.1117/12.2213295.

She et al., "Large area metalenses: design, characterization, and mass manufacturing", Optics Express, vol. 26, No. 2, Jan. 22, 2018, pp. 1573-1585, doi: 10.1364/OE.26.001573.

Shi et al., "Continuous angle-tunable birefringence with freeform metasurfaces for arbitrary polarization conversion", Science Advances, vol. 6, No. 23, eaba3367, Jun. 3, 2020, pp. 1-7, doi: 10.1126/sciadv.aba3367.

Shim et al., "Hard-tip, soft-spring lithography", Nature, vol. 469, Jan. 27, 2011, pp. 516-521, doi: 10.1038/nature09697.

Silvestri et al., "Robust design procedure for dielectric resonator metasurface lens array", Optics Express, vol. 24, No. 25, Dec. 12, 2016, pp. 29153-29169, doi: 10.1364/OE.24.029153.

Snik et al., "An Overview of Polarimetric Sensing Techniques and Technology with Applications to Different Research Fields", Pro-

(56)            References Cited

OTHER PUBLICATIONS ceedings of SPIE, Polarization: Measurement, Analysis, and Remote Sensing XI, vol. 9099, 2014, pp. 90990B-1-90990B-20, doi: 10.1117/12.2053245.

Sokolov, "Polarization of Spherical Waves", Optics and Spectroscopy, vol. 92, No. 6, Jun. 2002, pp. 936-942, doi: 10.1134/1.1490033.

Song et al., "Vividly-Colored Silicon Metasurface Based on Collective Electric and Magnetic Resonances", 11th Conference on Lasers and Electro-Optics Pacific Rim (CLEO-PR), 2015, 2 pgs., doi: 10.1109/CLEOPR.2015.7375849.

Sreelal et al., "Jones matrix microscopy from a single-shot intensity measurement", Optics Letters, vol. 42, No. 24, Dec. 15, 2017, pp. 5194-5197, doi: 10.1364/OL.42.005194.

Su et al., "Designing LED array for uniform illumination distribution by simulated annealing algorithm", Optics Express, vol. 20, No. S6, Nov. 5, 2012, pp. A843-A855, doi: 10.1364/oe.20.00a843.

Sun et al., "High-Efficiency Broadband Anomalous Reflection by Gradient Meta-Surfaces", Nano Letters, vol. 12, No. 12, Nov. 28, 2012, pp. 6223-6229, doi: 10.1021/nl3032668.

Tervo et al., "Paraxial-domain diffractive elements with 100% efficiency based on polarization gratings", Optics Letters, vol. 25, No. 11, Jun. 1, 2000, pp. 785-786, doi: 10.1364/OL.25.000785.

Todorov et al., "Polarization holography. 1: A new high-efficiency organic material with reversible photoinduced birefringence", Applied Optics, vol. 23, No. 23, Dec. 1, 1984, pp. 4309-4312, doi: 10.1364/AO.23.004309.

Todorov et al., "Spectrophotopolarimeter: fast simultaneous real-time measurement of light parameters", Optics Letters, vol. 17, No. 5, Mar. 1, 1992, pp. 358-359, doi: 10.1364/OL. 17.000358.

Trebino et al., "The Autocorrelation, the Spectrum, and Phase Retrieval", Frequency-Resolved Optical Gating: The Measurement of Ultrashort Laser Pulses, Springer, 2000, pp. 61-99, doi: 10.1007/978-1-4615-1181-6_4.

Tyo, "Design of optimal polarimeters: maximization of signal-to-noise ratio and minimization of systematic error", Applied Optics, vol. 41, No. 4, Feb. 1, 2002, pp. 619-630, doi: 10.1364/AO.41.000619.

Tyo, "Noise equalization in Stokes parameter images obtained by use of variable-retardance polarimeters", Optics Letters, vol. 25, No. 16. Aug. 15, 2000, pp. 1198-1200, doi: 10.1364/OL.25.001198.

Tyo et al., "Review of passive imaging polarimetry for remote sensing applications", Applied Optics, vol. 45, No. 22, Aug. 1, 2006, pp. 5453-5469, doi: 10.1364/AO.45.005453.

Tyo et al., "Target detection in optically scattering media by polarization-difference imaging", Applied Optics vol. 35, No. 11, Apr. 10, 1996, pp. 1855-1870, doi: 10.1364/AO.35.001855.

Urbanczyk, "Optical transfer function for imaging systems which change the state of light polarization", Optica Acta, vol. 33, No. 1, 1986, pp. 53-62, doi: 10.1080/713821863.

Vo et al., "Sub-Wavelength Grating Lenses with a Twist", IEEE Photonics Technology Letters, vol. 26, No. 13, Jul. 1, 2014, pp. 1375-1378, doi: 10.1109/LPT.2014.2325947.

Voelkel et al., "Laser Beam Homogenizing: Limitations and Constraints", SPIE, Europe, Optical Systems Design, 2008, 12 pgs.

Voelz, "Transmittance Functions, Lenses, and Gratings", Computational Fourier Optics: A MATLAB Tutorial, Chapter 6, 2011, pp. 89-111, do: 10.1117/3.858456.ch6.

Walther et al., "Spatial and Spectral Light Shaping with Metamaterials", Advanced Materials, vol. 24, No. 47, Dec. 11, 2012, pp. 6300-6304, doi: 10.1002/adma.201202540.

Wang et al., "Broadband achromatic optical metasurface devices", Nature Communications, vol. 8, No. 187, Aug. 4, 2017, pp. 1-9, doi: 10.1038/s41467-017-00166-7.

Wang et al., "Generation of steep phase anisotropy with zero-backscattering by arrays of coupled dielectric nano-resonators", Applied Physics Letters, vol. 105, No. 121112, Sep. 25, 2014, pp. 121112-1-121112-5, doi: 10.1063/1.4896631.

Wang et al., "Information authentication using an optical dielectric metasurface", Journal of Physics D: Applied Physics, Institute of Physics Publishing, Bristol, vol. 50, No. 36, Aug. 17, 2017, pp. 1-5, doi: 10.1088/1361-6463/aa7c97.

Wei et al., "Design of ultracompact polarimeters based on dielectric metasurfaces", Optics Letters, vol. 42, No. 8, Apr. 15, 2017, pp. 1580-1583, doi: 10.1364/OL.42.001580.

Wen et al., "Metasurface for characterization of the polarization state of light", Optics Express, vol. 23, No. 8, Apr. 20, 2015, pp. 10272-10281, doi: 10.1364/OE.23.010272.

Wiktorowicz et al., "Toward the Detection of Exoplanet Transits with Polarimetry", The Astrophysical Journal, vol. 795, No. 12, Nov. 1, 2014, 6 pgs., doi: 10.1088/0004-637X/795/1/12.

Wolf, "Introduction to the Theory of Coherence and Polarization of Light", Cambridge University Press, 2007, 235 pgs.

Wolff et al., "Constraining object features using a polarization reflectance model", IEEE Transactions on Pattern Analysis and Machine Intelligence, vol. 13, No. 7, Jul. 1991, pp. 635-657, doi: 10.1109/34.85655.

Wu et al., "Fully integrated CMOS-compatible polarization analyzer", Nanophotonics, vol. 8, No. 3, 2019, pp. 467-474, doi: 10.1515/nanoph-2018-0205.

Wu et al., "Spectrally selective chiral silicon metasurfaces based on infrared Fano resonances", Nature Communications, vol. 5, No. 3892, 2014, published online May 27, 2014, 9 pgs., doi: 10.1038/ncomms4892.

Xu et al., "Metasurface external cavity laser", Applied Physics Letters, vol. 107, No. 221105, 2015, pp. 221105-1-221105-5, doi: 10.1063/1.4936887.

Xu et al., "Metasurface quantum-cascade laser with electrically switchable polarization", Optica, vol. 4, No. 4, Apr. 2017, pp. 468-475, doi: 10.1364/optica.4.000468.

Yang et al., "Design of ultrathin plasmonic quarter-wave plate based on period coupling", Optics Letters, vol. 38, No. 5, Mar. 1, 2013, pp. 679-681, doi: 10.1364/OL.38.000679.

Yang et al., "Generalized Hartmann-Shack array of dielectric metalens sub-arrays for polarimetric beam profiling", Nature Communications, vol. 9, No. 4607, Nov. 2, 2018, pp. 1-7, doi: 10.1038/s41467-018-07056-6.

Yao et al., "Wide Wavelength Tuning of Optical Antennas on Graphene with Nanosecond Response Time", Nano Letters, vol. 14, No. 1, 2014, Dec. 3, 2013, pp. 214-219, doi: 10.1021/nl403751p.

Yu et al., "A Broadband, Background-Free Quarter-Wave Plate Based on Plasmonic Metasurfaces", Nano Letters, vol. 12, No. 12, Nov. 3, 2012, pp. 6328-6333, doi: 10.1021/nl303445u.

Yu et al., "Flat optics with designer metasurfaces", Nature Materials, vol. 13, Feb. 2014, pp. 139-150, doi :10.1038/NMAT3839.

Yu et al., "Flat Optics: Controlling Wavefronts With Optical Antenna Metasurfaces", IEEE Journal of Selected Topics, vol. 19, No. 3, May/Jun. 2013, 23 pgs., doi: 10.1109/JSTQE.2013.2241399.

Yu et al., "High-transmission dielectric metasurface with 2TT phase control at visible wavelengths", Laser & Photonics Reviews, vol. 9, No. 4, Jul. 2015, pp. 412-418, doi: 10.1002/lpor.201500041.

Yu et al., "Light Propagation with Phase Discontinuities: Generalized Laws of Reflection and Refraction", Science, vol. 334, No. 6054, Oct. 21, 2011, pp. 333-337, doi: 10.1126/science.1210713.

Yu et al., "Optical Metasurfaces and Prospect of Their Applications Including Fiber Optics", Journal of Lightwave Technology, vol. 33, No. 12, Jun. 15, 2015, pp. 2344-2358, doi: 10.1109/JLT.2015.2404860.

Yu et al., "Quantum cascade lasers with integrated plasmonic antenna-array collimators", Optics Express, vol. 16, No. 24, Nov. 24, 2008, pp. 19447-19461, doi: 10.1364/OE.16.019447.

Yu et al., "Small divergence edge-emitting semiconductor lasers with two-dimensional plasmonic collimators", Applied Physics Letters, vol. 93, No. 181101, 2008, pp. 181101-1-181101-3, doi: 10.1063/1.3009599.

Yu et al., "Small-divergence semiconductor lasers by plasmonic collimation", Nature Photonics, vol. 2, Sep. 2008, pp. 564-570, doi: 10.1038/nphoton.2008.152.

Yun et al., "Skew aberration: a form of polarization aberration", Optics Letters, vol. 36, No. 20, Oct. 15, 2011, pp. 4062-4064, doi: 10.1364/OL.36.004062.

(56) References Cited

OTHER PUBLICATIONS

Zhan et al., "Low-Contrast Dielectric Metasurface Optics", ACS Photonics, vol. 3, No. 2, Feb. 1, 2016, pp. 209-214, doi: 10.1021/acsphotonics.5b00660.

Zhang et al., "High efficiency all-dielectric pixelated metasurface for near-infrared full-Stokes polarization detection", Photonics Research, vol. 9, No. 4, Apr. 2021, pp. 583-589, doi: 10.1364/PRJ.415342.

Zhao et al., "Mie resonance-based dielectric metamaterials", Materials Today, vol. 12, No. 12, Dec. 2009, pp. 60-69, doi: 10.1016/S1369-7021(09)70318-9.

Zhao et al., "Multichannel vectorial holographic display and encryption", Light Science & Applications, vol. 7, No. 95, Nov. 28, 2018, 9 pgs., doi: 10.1038/s41377-018-0091-0.

Zhao et al., "Recent Advances on Optical Metasurfaces", Journal of Optics, vol. 16, No. 12, Nov. 27, 2014, 14 pgs., doi: 10.1088/2040489781/16/12/123001.

Zhao et al., "Tailoring the Dispersion of Plasmonic Nanorods to Realize Broadband Optical Meta-Waveplates", Nano Letter, vol. 13, No. 3, Feb. 5, 2013, pp. 1086-1091, doi: 10.1021/nl304392b.

Zhao et al., "Twisted optical metamaterials for planarized ultrathin broadband circular polarizers", Nature Communications, vol. 3, No. 870, May 29, 2012, pp. 1-7, doi: 10.1038/ncomms1877.

Zhou et al., "Characteristic Analysis of Compact Spectrometer Based on Off-Axis Meta-Lens", Applied Sciences, vol. 8, No. 321, 2018, 11 pgs., doi: 10.3390/app8030321.

Cloude, "Conditions for the physical realisability of matrix operators in polarimetry", Proceedings of SPIE, Polarization Considerations for Optical Systems II, vol. 1166, 1989, pp. 177-185, doi: 10.1117/12.962889.

Cofre et al., "Quantitative performance of a polarization diffraction grating polarimeter encoded onto two liquid-crystal-on-silicon displays", Optics & Laser Technology, vol. 96, Nov. 2017, pp. 219-226, doi: 10.1016/j.optlastec.2017.05.027.

Cui et al., "Sixteen-beam grating-based division-of-amplitude photopolarimeter", Optics Letters, vol. 21, No. 1, Jan. 1, 1996, pp. 89-91, doi: 10.1364/OL.21.000089.

Cumme et al., "From regular periodic micro-lens arrays to randomized continuous phase profiles", Advanced Optical Technologies, vol. 4, No. 1, Feb. 6, 2015, pp. 47-61, doi: 10.1515/aot-2014-0062.

Davis et al., "Diffraction gratings generating orders with selective states of polarization", Optics Express, vol. 24, No. 2, Jan. 2016, pp. 907-917, doi: 10.1364/OE.24.000907.

Davis et al., "Polarization beam splitters using polarization diffraction gratings", Optics Letters, vol. 26, No. 9, May 1, 2001, pp. 587-589, doi: 10.1364/OL.26.000587.

Dayal et al., "Polarization control of 0.85μm vertical-cavity surface-emitting lasers integrated with gold nanorod arrays", Applied Physics Letters, vol. 91, No. 11, Sep. 12, 2007, pp. 111107-1-111107-3, doi: 10.1063/1.2783281.

Decker et al., "High-efficiency light-wave control with all-dielectric optical Huygens' metasurfaces", arXiv:1405.5038v1 [physics.optics] [v1], May 20, 2014, 17 pgs.

Demos et al., "Optical polarization imaging", Applied Optics vol. 36, No. 1, Jan. 1, 1997, pp. 150-155, doi: 10.1364/AO.36.000150.

Deng et al., "Diatomic Metasurface for Vectorial Holography", Nano Letters, vol. 18, No. 5, Mar. 28, 2018, pp. 2885-2892, doi: 10.1021/acs.nanolett.8b00047.

Deschapms et al., "The POLDER Mission: Instrument Characteristics and Scientific Objectives", IEEE Transactions on Geoscience and Remote Sensing, vol. 32, No. 3, May 1994, pp. 598-615, doi: 10.1109/36.297978.

Devlin et al., "Arbitrary spin-to-orbital angular momentum conversion of light", Science, vol. 358, No. 6365, Nov. 17, 2017, pp. 896-901, doi: 10.1126/science.aao5392.

Devlin et al., "Broadband high-efficiency dielectric metasurfaces for the visible spectrum", PNAS, vol. 113, No. 38, Sep. 6, 2016, pp. 10473-10478, XP055955541, ISSN: 0027-8424, doi: 10.1073/pnas.1611740113.

Devlin et al., "High efficiency dielectric metasurfaces at visible wavelengths", arXiv:1603.02735v1 [physics.optics][v1], Mar. 8, 2016, pp. 1-18.

Ding et al., "Beam-Size-Invariant Spectropolarimeters Using Gap-Plasmon Metasurfaces", ACS Photonics, vol. 4, No. 4, Feb. 28, 2017, pp. 943-949, doi: 10.1021/acsphotonics.6b01046.

Ding et al., "Gradient metasurfaces: fundamentals and applications", arXiv:1704:03032v1 [physics.optics], Apr. 10, 2017, 83 pgs.

Ding et al., "Versatile Polarization Generation and Manipulation Using Dielectric Metasurfaces", Laser & Photonics Review, vol. 14, No. 11, Article 2000116, Nov. 2020, pp. 1-7, doi: 10.1002/lpor.202000116.

Dong et al., "Zero-Index Photonic Crystal as Low-Aberration Optical Lens (Conference Presentation)", Proceedings of SPIE, Metamaterials, Metadevices, and Metasystems, vol. 9918, No. 991822, Nov. 9, 2016, p. 991822-1, doi: 10.1117/12.2237137.

Engelberg et al., "Near-IR wide-field-of-view Huygens metalens for outdoor imaging applications", Nanophotonics, vol. 9, No. 2, 2020, pp. 361-370, doi: 10.1515/nanoph-2019-0177.

Espinosa-Soria et al., "On-Chip Optimal Stokes Nanopolarimetry Based on Spin-Orbit Interaction of Light", Nano Letters, vol. 17, No. 5, Apr. 7, 2017, pp. 3139-3144, doi: 10.1021/acs.nanolett.7b00564.

Evlyukhin et al., "Optical response features of Si-nanoparticle arrays", Physical Review B, vol. 82, No. 045404, Jul. 8, 2010, pp. 045404-1-045404-11, doi: 10.1103/PhysRevB.82.045404.

Fattal et al., "Flat dielectric grating reflectors with focusing abilities", Nature Photonics, vol. 4, May 2, 2010, pp. 466-470, doi: 10.1038/nphoton.2010.116.

Fienup, "Phase retrieval algorithms: A comparison", Applied Optics, vol. 21, No. 15, Aug. 1, 1982, pp. 2758-2769, doi: 10.1364/AO.21.002758.

Garcia et al., "Surface normal reconstruction using circularly polarized light", Optics Express, vol. 23, No. 11, Jun. 1, 2015, pp. 14391-14406, doi: 10.1364/OE.23.014391.

Genevet et al., "Breakthroughs in Photonics 2013: Flat Optics: Wavefronts Control with Huygens' Interfaces", IEEE Photonics Journal, vol. 6, No. 2, Art No. 0700404, Apr. 2014, 4 pgs., doi: 10.1109/JPHOT.2014.2308194.

Genevet et al., "Recent advances in planar optics: from plasmonic to dielectric metasurfaces", Optica, vol. 4, No. 1, Jan. 2017, pp. 139-152, doi: 10.1364/OPTICA.4.000139.

Gerchberg et al., "A Practical Algorithm for the Determination of Phase from Image and Diffraction Plane Pictures", Optik, vol. 35, No. 2, 1972, pp. 1-6.

Goldberg, "Genetic Algorithms in Search, Optimization, and Machine Learning", Addison Wesley, 1989, 432 pgs., (presented in 2 parts).

Gori, "Measuring Stokes parameters by means of a polarization grating", Optics Letters, vol. 24, No. 9, May 1, 1999, pp. 584-586, doi: 10.1364/OL.24.000584.

Groever et al., "Meta-Lens Doublet in the Visible Region", Nano Letters, vol. 17, No. 8, Jun. 29, 2017, pp. 4902-4907, doi: 10.1021/acs.nanolett.7b01888.

Gutierrez-Vega, "Optical phase of inhomogeneous Jones matrices: retardance and ortho-transmission states", Optics Letters, vol. 45, No. 7, Apr. 1, 2020, pp. 1639-1642, doi: 10.1364/OL.387644.

Hartwig et al., "Challenges for Reducing the Size of Laser Activated Remote Phosphor Light Engines for DLP Projection", Proceedings of SPIE, International Optical Design Conference, vol. 9293, Dec. 17, 2014, pp. 929313-1-929313-6, doi: 10.1117/12.2073275.

Hasman et al., "Polarization dependent focusing lens by use of quantized Pancharatnam-Berry phase diffractive optics", Applied Physics Letters, vol. 82, No. 3, Jan. 20, 2003, pp. 328-330, doi: 10.1063/1.1539300.

Herrera-Fernandez et al., "Double diffractive optical element system for near-field shaping", Applied Optics, vol. 50, No. 23, Aug. 10, 2011, pp. 4587-4593, doi: 10.1364/AO.50.004587.

Hidber et al., "Microcontact Printing of Palladium Colloids: Micron-Scale Patterning by Electroless Deposition of Copper", Langmuir, vol. 12, No. 5, Mar. 6, 1996, pp. 1375-1380, doi: 10.1021/la9507500.

Horie et al., "Reflective Optical Phase Modulator Based on High-Contrast Grating Mirrors", Conference on Lasers and Electro-

(56) References Cited

OTHER PUBLICATIONS

Optics (CLEO)—Laser Science to Photonic Applications, 2014, 2 pgs., doi: 10.1364/CLEO_SI.2014.STh4M.8.

Hsiao et al., "Fundamentals and Applications of Metasurfaces", Small Methods, vol. 1, No. 4, Article 1600064, Mar. 24, 2017, 20 pgs., doi: 10.1002/smtd.201600064.

Jang et al., "Wavefront shaping with disorder-engineered metasurfaces", Nature Photonics, vol. 12, Jan. 15, 2018, pp. 84-90, doi: 10.1038/s41566-017-0078-z.

Jin et al., "Waveforms for optimal sub-keV high-order harmonics with synthesized two- or three-colour laser fields", Nature Communications, vol. 5, No. 4003, May 30, 2014, pp. 1-6, doi: 10.1038/ncomms5003.

Juan et al., "Arbitrary Polarization Transformation Based on Two-Dimensional Metallic Rectangular Gratings", Acta Optica Sinica, vol. 31, No. 12, Dec. 31, 2011, pp. 1224001-1-1224001-5, doi: 10.3788/AOS201131.1224001.

Kadambi et al., "Polarized 3D: High-Quality Depth Sensing with Polarization Cues", IEEE International Conference on Computer Vision (ICCV), 2015, pp. 3370-3378, doi: 10.1109/ICCV.2015.385.

Karagodsky et al., "Monolithically integrated multi-wavelength VCSEL arrays using high-contrast gratings", Optics Express, vol. 18, No. 2, Jan. 18, 2010, pp. 694-699, doi: 10.1364/OE.18.000694.

Kats et al., "Giant birefringence in optical antenna arrays with widely tailorable optical anisotropy", PNAS, vol. 109, No. 31, Jul. 31, 2012, pp. 12364-12368, doi: 10.1073/pnas.1210686109.

Khorasaninejad et al., "Achromatic Metalens over 60 nm Bandwidth in the Visible and Metalens with Reverse Chromatic Dispersion", Nano Letters, vol. 17, No. 3, Jan. 26, 2017, pp. 1819-1824, doi: 10.1021/acs.nanolett.6b05137.

Khorasaninejad et al., "Achromatic Metasurface Lens at Telecommunication Wavelengths", Nanno Letters, vol. 15, No. 8, Jul. 13, 2015, pp. 5358-5362, doi: 10.1021/acs.nanolett.5b01727.

Khorasaninejad et al., "Broadband and chiral binary dielectric meta-holograms", Science Advances, vol. 2, No. 5, e1501258, May 13, 2016, pp. 1-6, doi: 10.1126/sciadv.1501258.

Khorasaninejad et al., "Broadband Multifunctional Efficient Meta-Gratings Based on Dielectric Waveguide Phase Shifters", Nano Letters, vol. 15, No. 10, Sep. 15, 2015, pp. 6709-6715, doi: 10.1021/acs.nanolett.5b02524.

Khorasaninejad et al., "Metalenses at visible wavelengths: Diffraction-limited focusing and subwavelength resolution imaging", Science, vol. 352, No. 6290, Jun. 3, 2016, pp. 1190-1194, XP055490038, ISSN: 0036-8075, doi: 10.1126/science.aaf6644.

Khorasaninejad et al., "Multispectral Chiral Imaging with a Metalens", Nano Letters, vol. 16, No. 7, Jun. 7, 2016, pp. 4595-4600, doi: 10.1021/acs.nanolett.6b01897.

Khorasaninejad et al., "Planar Lenses at Visible Wavelengths", arXiv:1605.02248v1 [physics.optics][v1], May 7, 2016, 17 pgs.

Khorasaninejad et al., "Polarization-Insensitive Metalenses at Visible Wavelengths", Nano Letters, vol. 16, No. 11, Oct. 24, 2016, pp. 7229-7234, doi: 10.1021/acs.nanolett.6b03626.

Khorasaninejad et al., "Silicon nanofin grating as a miniature chirality-distinguishing beam-splitter", Nature Communications, vol. 5, No. 5386, Nov. 12, 2014, 6 pgs., doi: 10.1038/ncomms6386.

Khorasaninejad et al., "Super-Dispersive Off-Axis Meta-Lenses for Compact High Resolution Spectroscopy", Nano Letters, vol. 16, No. 6, Apr. 27, 2016, pp. 3732-3737, XP055430440, ISSN: 1530-6984, doi: 10.1021/acs.nanolett.6b01097.

Khorasaninejad et al., "Visible Wavelength Planar Metalenses Based on Titanium Dioxide", IEEE Journal of Selected Topics in Quantum Electronics, vol. 23, No. 3, May/Jun. 2017, pp. 43-58, Art No. 4700216, doi: 10.1109/JSTQE.2016.2616447.

Kildishev et al., "Planar Photonics with Metasurfaces", Science, vol. 339, No. 6125, Mar. 15, 2013, pp. 1232009-1-1232009-6, DOI: 10.1126.science.1232009.

Kim et al., "Fabrication of ideal geometric-phase holograms with arbitrary wavefronts", Optica, vol. 2, No. 11, Nov. 2015, pp. 958-964, doi: 10.1364/optica.2.000958.

Kokkoris et al., "Nanoscale Roughness Effects at the Interface of Lithography and Plasma Etching: Modeling of Line-Edge-Roughness Transfer During Plasma Etching", IEEE Transactions on Plasma Science, vol. 37, No. 9, Sep. 2009, pp. 1705-1714, doi: 10.1109/TPS.2009.2024117.

Kominami et al., "Dipole and Slot Elements and Arrays on Semi-Infinite Substrates", IEEE Transactions on Antennas and Propagation, vol. AP33, No. 6, Jun. 1985, pp. 600-607, doi: 10.1109/TAP.1985.1143638.

Krasnok et al., "All-dielectric optical nanoantennas", Optics Express, vol. 20, No. 18, Aug. 27, 2012, pp. 20599-20604, doi: 10.1063/1.4750083.

Kress et al., "Applied Digital Optics from Micro-Optics to Nanophotonics", Applied Digital Optics, Wiley, 2009, 30 pages.

Kudenov et al., "White-light channeled imaging polarimeter using broadband polarization gratings", Applied Optics vol. 50, No. 15, May 20, 2011, pp. 2283-2293, doi: 10.1364/AO.50.002283.

Lalanne et al., "Interaction between optical nano-objects at metallo-dielectric interfaces", Nature Physics, vol. 2, Aug. 2006, pp. 551-556, doi: 10.1038/nphys364.

Lee et al., "Giant nonlinear response from plasmonic metasurfaces coupled to intersubband transitions", Nature, vol. 511, Jul. 3, 2014, pp. 65-69, doi: 10.1038/nature13455.

Leveque et al., "Transient behavior of surface plasmon polaritons scattered at a subwavelength groove", Physical Reviews B, vol. 76, No. 155418, Oct. 18, 2007, pp. 155418-1-155418-8, doi: 10.1103/PhysRevB.76.155418.

Lezec et al., "Beaming Light from a Subwavelength Aperture", Science, vol. 297, No. 5582, Aug. 2, 2002, pp. 820-822, doi: 10.1126/science.1071895.

Li et al., "Achromatic flat optical components via compensation between structure and material dispersions", Scientific Reports, vol. 6, No. 19885, Jan. 22, 2016, pp. 1-7, doi: 10.1038/srep19885.

Li et al., "All-silicon nanorod-based Dammann gratings", Optics Letters, vol. 40, No. 18, Sep. 15, 2015, pp. 4285-4288, doi: 10.1364/OL.40.004285.

Li et al., "Broadband diodelike asymmetric transmission of linearly polarized light in ultrathin hybrid metamaterial", Applied Physics Letters, vol. 105, No. 20, Nov. 19, 2014, pp. 201103-1-201103-5, doi: 10.1063/1.4902162.

Li et al., "Dispersion controlling meta-lens at visible frequency", Optics Express, vol. 25, No. 18, Sep. 4, 2017, pp. 21419-21427, doi: 10.1364/OE.25.021419.

Li et al., "Flat metasurfaces to focus electromagnetic waves in reflection geometry", Optics Letters, vol. 37, No. 23, Dec. 1, 2012, pp. 4940-4942, doi: 10.1364/OL.37.004940.

Li et al., "Metalens-Based Miniaturized Optical Systems", Micromachines, vol. 10, No. 310, May 8, 2019, pp. 1-21, doi: 10.3390/mi10050310.

Lim et al., "Self-mixing imaging sensor using a monolithic VCSEL array with parallel readout", Optics Express, vol. 17, No. 7, Mar. 30, 2009, pp. 5517-5525, doi: 10.1364/oe.17.005517.

Lin et al., "Dielectric gradient metasurface optical elements", Science, vol. 345, No. 6194, Jul. 18, 2014, pp. 298-302, doi: 10.1126/science.1253213.

Liu et al., "Realization of polarization evolution on higher-order Poincaré sphere with metasurface", Applied Physics Letters, vol. 104, No. 19, 2014, pp. 191110-1-191101-4, doi: 10.1063/1.4878409.

Liu et al., "Single-pixel computational ghost imaging with helicity-dependent metasurface hologram", Science Advances, vol. 3, No. 9, Article e1701477, Sep. 8, 2017, pp. 1-6, doi: 10.1126/sciadv.1701477.

Lizana et al., "Arbitrary state of polarization with customized degree of polarization generator", Optics Letters, vol. 40, No. 16, Aug. 15, 2015, pp. 3790-3793, doi: 10.1364/OL.40.003790.

Lo et al., "New architecture for space telescopes uses Fresnel lenses", SPIE Newsroom, Aug. 9, 2006, 2 pgs., doi: 10.1117/2.1200608.0333.

Lohmann, "Reconstruction of Vectorial Wavefronts", Applied Optics, vol. 4, No. 12, Dec. 1965, pp. 1667-1668, doi: 10.1364/AO.4.001667.

(56) References Cited

OTHER PUBLICATIONS

Lu et al., "Homogeneous and inhomogeneous Jones matrices", Journal of the Optical Society of America A, vol. 11, No. 2, Feb. 1994, pp. 766-773, doi: 10.1364/JOSAA.11.000766.

Lu et al., "Interpretation of Mueller matrices based on polar decomposition", Journal of the Optical Society of America A, vol. 13, No. 5, May 1996, pp. 1106-1113, doi: 10.1364/JOSAA.13.001106.

Lu et al., "Planar high-numerical-aperture low-loss focusing reflectors and lenses using subwavelength high contrast gratings", Optics Express, vol. 18, No. 12, Jun. 7, 2010, pp. 12606-12614, doi: 10.1364/OE.18.012606.

Mackus et al., "The use of atomic layer deposition in advanced nanopatterning", Nanoscale, vol. 6, 2014, pp. 10941-10960, doi: 10.1039/C4NR01954G.

Maguid et al., "Multifunctional interleaved geometric-phase dielectric metasurfaces", Light: Science & Applications, vol. 6, No. e17027, Feb. 24, 2017, pp. 1-7, doi: 10.1038/lsa.2017.27.

Maguid et al., "Photonic spin-controlled multifunctional shared-aperture antenna array", Science, vol. 352, No. 6290, Apr. 21, 2016, pp. 1202-1206, doi: 10.1126/science.aaf3417.

Mao et al., "Nanopatterning using a simple bi-layer lift-off process for the fabrication of a photonic crystal nanostructure", Nanotechnology, vol. 24, No. 8, Article 085302, Feb. 1, 2013, pp. 1-6, doi: 10.1088/0957-4484/24/8/085302.

Mao et al., "Surface patterning of nonscattering phosphors for light extraction", Optics Letters, vol. 38, No. 15, Aug. 1, 2013, pp. 2796-2799, doi: 10.1364/OL.38.002796.

Martinez, "Polarimetry enabled by nanophotonics", Science, vol. 363, No. 6416, Nov. 16, 2018, pp. 750-751, doi: 10.1126/science.aau7494.

Martin-Moreno et al., "Theory of Highly Directional Emission from a Single Subwavelength Aperture Surrounded by Surface Corrugations", Physical Review Letters, vol. 90, No. 16, Apr. 25, 2003, pp. 167401-1-167401-4, doi: 10.1103/PnysRevLett.9.167401.

Martin-Regalado et al., "Polarization Properties of Vertical-Cavity Surface-Emitting Lasers", IEEE Journal of Quantum Electronics, vol. 33, No. 5, May 1997, pp. 765-783, doi: 10.1109/3.572151.

Meng et al., "A Novel Nanofabrication Technique of Silicon-Based Nanostructures", Nanoscale Research Letters vol. 11, No. 504, Nov. 15, 2016, pp. 1-9, doi: 10.1186/s11671-016-1702-4.

Menzel et al., "Advanced Jones calculus for the classification of periodic metamaterials", Physical Review A, vol. 82, No. 053811, Nov. 15, 2010, pp. 053811-1-053811-9, doi: 10.1103/PhysRevA.82.053811.

Mirsalehi, "Optical Information Processing", Encyclopedia of Physical Science and Technology, 3rd edition, 2001, pp. 335-340.

Miyazaki et al., "Ultraviolet-nanoimprinted packaged metasurface thermal emitters for infrared $CO_2$ sensing", Science and Technology of Advanced Materials, vol. 16, No. 3, Article 035005, May 20, 2015, pp. 1-5, doi: 10.1088/1468-6996/16/3/035005.

Monticone et al., "Full Control of Nanoscale Optical Transmission with a Composite Metascreen", Physical Review Letters, vol. 110, No. 203903, May 17, 2013, pp. 203903-1-203903-5, doi: 10.1103/PhysRevLett.110.203903.

International Preliminary Report on Patentability for International Application No. PCT/US2018/038357, Report issued Dec. 24, 2019, Mailed Jan. 2, 2020, 7 pgs.

International Preliminary Report on Patentability for International Application No. PCT/US2008/084068, Report issued May 25, 2010, 5 pgs.

International Preliminary Report on Patentability for International Application No. PCT/US2012/053434, Report issued Mar. 4, 2014, Mailed Mar. 13, 2014, 7 pgs.

International Preliminary Report on Patentability for International Application No. PCT/US2015/064930, Report issued Jun. 13, 2017, Mailed Jun. 22, 2017, 9 pgs.

International Preliminary Report on Patentability for International Application No. PCT/US2016/052685, Report issued Mar. 27, 2018, Mailed Apr. 5, 2018, 9 pgs.

International Preliminary Report on Patentability for International Application No. PCT/US2016/063617, Report issued May 29, 2018, Mailed Jun. 7, 2018, 7 pgs.

International Preliminary Report on Patentability for International Application No. PCT/US2017/026206, Report issued Oct. 9, 2018, Mailed Oct. 18, 2018, 9 pgs.

International Preliminary Report on Patentability for International Application No. PCT/US2017/036897, Report issued Dec. 11, 2018, Mailed Dec. 20, 2018, 9 pgs.

International Preliminary Report on Patentability for International Application No. PCT/US2017/048469, Report issued Feb. 26, 2019, Mailed Mar. 7, 2019, 6 pgs.

International Preliminary Report on Patentability for International Application No. PCT/US2018/031204, Report issued Nov. 5, 2019, Mailed Nov. 14, 2019, 9 pgs.

International Preliminary Report on Patentability for International Application No. PCT/US2018/034460, Report issued Nov. 26, 2019, Mailed Dec. 5, 2019, 7 pgs.

International Preliminary Report on Patentability for International Application No. PCT/US2018/035502, Report issued Dec. 3, 2019, Mailed Dec. 12, 2019, 8 pgs.

International Preliminary Report on Patentability for International Application No. PCT/US2018/046947, Report issued Feb. 18, 2020, Mailed on Feb. 27, 2020, 7 pgs.

International Preliminary Report on Patentability for International Application No. PCT/US2018/049276, Report issued on Mar. 3, 2020, Mailed on Mar. 12, 2020, 9 pgs.

International Preliminary Report on Patentability for International Application No. PCT/US2019/014975, Report issued Jul. 28, 2020, Mailed on Aug. 6, 2020, 10 pgs.

International Preliminary Report on Patentability for International Application No. PCT/US2019/040302, Report issued Jan. 5, 2021, Mailed Jan. 14, 2021, 6 pgs.

International Preliminary Report on Patentability for International Application No. PCT/US2020/028157, Report issued Sep. 28, 2021, Mailed Oct. 28, 2021, 7 pgs.

International Preliminary Report on Patentability for International Application No. PCT/US2020/028159, Report issued Sep. 28, 2021, Mailed on Oct. 28, 2021, 7 pgs.

International Preliminary Report on Patentability for International Application No. PCT/US2020/043600, Report issued Feb. 1, 2022, Mailed on Feb. 10, 2022, 9 pgs.

International Preliminary Report on Patentability for International Application No. PCT/US2022/070043, Report issued Jul. 4, 2023, Mailed on Jul. 20, 2023, 10 pgs.

International Preliminary Report on Patentability for International Application No. PCT/US2022/081868, Report issued Jun. 13, 2024, Mailed on Jun. 27, 2024, 7 pgs.

International Search Report and Written Opinion for International Application No. PCT/US2008/084068, Search completed Jan. 13, 2009, Mailed Feb. 2, 2009, 6 pgs.

International Search Report and Written Opinion for International Application No. PCT/US2012/053434, Search completed Oct. 17, 2012, Mailed Dec. 17, 2012, 7 pgs.

International Search Report and Written Opinion for International Application No. PCT/US2015/064930, Search completed Sep. 9, 2016, Mailed Sep. 20, 2016, 11 pgs.

International Search Report and Written Opinion for International Application No. PCT/US2016/052685, Search completed Nov. 30, 2016, Mailed Dec. 9, 2016, 12 pgs.

International Search Report and Written Opinion for International Application No. PCT/US2016/063617, Search completed Jan. 19, 2017, Mailed Mar. 31, 2017, 9 pgs.

International Search Report and Written Opinion for International Application No. PCT/US2017/026206, Search completed Jun. 10, 2017, Mailed Jun. 28, 2017, 15 pgs.

International Search Report and Written Opinion for International Application No. PCT/US2017/036897, Search completed Jan. 31, 2018, Mailed Feb. 21, 2018, 9 pgs.

International Search Report and Written Opinion for International Application No. PCT/US2017/048469, Search completed Apr. 20, 2018, Mailed May 4, 2018, 9 pgs.

(56) References Cited

OTHER PUBLICATIONS

International Search Report and Written Opinion for International Application No. PCT/US2018/031204, Search completed Jun. 29, 2018, Mailed Jul. 23, 2018, 14 pgs.
International Search Report and Written Opinion for International Application No. PCT/US2018/034460, Search completed Jul. 29, 2018, Mailed Aug. 24, 2018, 10 pgs.
International Search Report and Written Opinion for International Application No. PCT/US2018/035502, Search completed Jul. 31, 2018, Mailed Aug. 24, 2018, 13 pgs.
International Search Report and Written Opinion for International Application No. PCT/US2018/038357, Search completed Apr. 9, 2019, Mailed May 13, 2019, 12 pgs.
International Search Report and Written Opinion for International Application No. PCT/US2018/046947, Search completed Oct. 14, 2019, Mailed Oct. 25, 2019, 10 pgs.
International Search Report and Written Opinion for International Application No. PCT/US2018/049276, Search completed Oct. 26, 2018, Mailed Jan. 15, 2019, 12 pgs.
International Search Report and Written Opinion for International Application No. PCT/US2019/014975, Search completed Jun. 17, 2019, Mailed Jul. 8, 2019, 10 pgs.
International Search Report and Written Opinion for International Application No. PCT/US2019/018615, Search completed Apr. 12, 2019, Mailed May 6, 2019, 12 pgs.
International Search Report and Written Opinion for International Application No. PCT/US2019/040302, Search completed Aug. 29, 2019, Mailed Oct. 17, 2019, 6 pgs.
International Search Report and Written Opinion for International Application No. PCT/US2020/028157, Search completed Jun. 16, 2020, Mailed Sep. 4, 2020, 9 pgs.
International Search Report and Written Opinion for International Application No. PCT/US2020/028159, Search completed Jun. 15, 2020, Mailed Aug. 11, 2020, 7 pgs.
International Search Report and Written Opinion for International Application No. PCT/US2020/043600, Search completed Sep. 29, 2020, Mailed Nov. 24, 2020, 11 pgs.
International Search Report and Written Opinion for International Application No. PCT/US2021/031423, Search completed Jul. 15, 2021, Mailed Aug. 16, 2021, 7 pgs.
International Search Report and Written Opinion for International Application No. PCT/US2021/065231, Search completed Apr. 19, 2022, Mailed May 13, 2022, 14 pgs.
International Search Report and Written Opinion for International Application No. PCT/US2022/038059, Search completed Sep. 27, 2022, Mailed Oct. 27, 2022, 17 pgs.
International Search Report and Written Opinion for International Application No. PCT/US2022/070043, Search completed May 5, 2022, Mailed Jun. 9, 2022, 16 pgs.
International Search Report and Written Opinion for International Application No. PCT/US2022/081868, Search completed Mar. 23, 2023, Mailed Apr. 4, 2023, 13 pgs.
Partial European Search Report for European Application No. 19744012.6, Search completed Sep. 3, 2021, Mailed Sep. 15, 2021, 12 pgs.
Search Report and Written Opinion for Singapore Patent Application No. SG11201808772W, Search completed Jan. 20, 2020, Mailed Jan. 28, 2020, 12 pgs.
Supplementary Partial European Search Report for European Application No. 16869282.0, Search completed Jun. 19, 2019, Mailed Jul. 2, 2019, 12 pgs.
"Stokes Polarization Parameters", Retrieved from Internet: <https://www.fiberoptics4sale.com/blogs/wave-optics/102492742-stokes-polarization-parameters>, Retrieved on Sep. 30, 2025, 13 pgs.
Aieta et al., "Aberration-Free Ultrathin Flat Lenses and Axicons at Telecom Wavelengths Based on Plasmonic Metasurfaces", Nano Letters, vol. 12, No. 9, Aug. 15, 2012, pp. 4932-4936, doi: 10.1021/nl302516v.

Aieta et al., "Aberrations of flat lenses and aplanatic metasurfaces", Optics Express, vol. 21, No. 25, Dec. 16, 2013, pp. 31530-31539, doi: 10.1364/OE.21.031530.
Aieta et al., "Multiwavelength achromatic metasurfaces by dispersive phase compensation", Science, vol. 347, No. 6228, Mar. 20, 2015, pp. 1342-1345, doi: 10.1126/science.aaa2494.
Aieta et al., "Out-of-Plane Reflection and Refraction of Light by Anisotropic Optical Antenna Metasurfaces with Phase Discontinuities", Nano Letters, vol. 12, No. 3, Feb. 15, 2012, pp. 1702-1706, doi: 10.1021/nl300204s.
Andreou et al., "Polarization Imaging: Principles and Integrated Polarimeters", IEEE Sensors Journal, vol. 2, No. 6, Dec. 2002, pp. 566-576, doi: 10.1109/JSEN.2003.807946.
Arbabi et al., "Dielectric metasurfaces for complete control of phase and polarization with subwavelength spatial resolution and high transmission", Nature Nanotechnology, vol. 10, Nov. 2015, pp. 937-943, doi: 10.1038/NNANO.2015.186.
Arbabi et al., "Efficient dielectric metasurface collimating lenses for mid-infrared quantum cascade lasers", Optics Express, vol. 23, No. 26, Dec. 28, 2015, pp. 33310-33317, doi: 10.1364/OE.23.033310.
Arbabi et al., "Full-Stokes Imaging Polarimetry Using Dielectric Metasurfaces", ACS Photonics, vol. 5, No. 8, Jul. 16, 2018, pp. 3132-3140, doi: 10.1021/acsphotonics.8b00362.
Arbabi et al., "Miniature optical planar camera based on a wide-angle metasurface doublet corrected for monochromatic aberrations", Nature Communications, vol. 7, No. 13682, Nov. 28, 2016, 9 pgs., XP055560394, doi: 10.1038/ncomms13682.
Arbabi et al., "Subwavelength-thick lenses with high numerical apertures and large efficiency based on high-contrast transmitarrays", Nature Communications, vol. 6, No. 7069, May 7, 2015, pp. 1-6, doi: 10.1038/ncomms8069.
Arbabi et al., "Supplementary Figures of Miniature Optical Planar Camera Based on a Wide-Angle Metasurface Doublet Corrected for Monochromatic Aberrations", Nature Communications, vol. 7, No. 13682, Nov. 28, 2016, 9 pgs.
Arbabi et al., "Vectorial Holograms with a Dielectric Metasurface: Ultimate Polarization Pattern Generation", ACS Photonics, vol. 6, No. 11, Sep. 18, 2019, pp. 2712-2718, doi: 10.1021/acsphotonics.9b00678.
Arrizon et al., "Pixelated phase computer holograms for the accurate encoding of scalar complex fields", Journal of the Optical Society of America A, vol. 24, No. 11, Nov. 2007, pp. 3500-3507, doi: 10.1364/JOSAA.24.003500.
Azadegan et al., "A Novel Approach for Miniaturization of Slot Antennas", IEEE Transactions on Antennas and Propagation, vol. 51, No. 3, Mar. 2003, pp. 421-429, doi: 10.1109/TAP.2003.809853.
Azzam, "Arrangement of four photodetectors for measuring the state of polarization of light", Optics Letters, vol. 10, No. 7, Jul. 1985, pp. 309-311, doi: 10.1364/OL.10.000309.
Azzam, "Division-of-amplitude photopolarimeter (DOAP) for the simultaneous measurement of all four Stokes parameters of light", Optica Acta, vol. 29, No. 5, 1982, pp. 685-689, doi: 10.1080/713820903.
Azzam et al., "Accurate calibration of the four-detector photopolarimeter with imperfect polarizing optical elements", Journal of the Optical Society of America A, vol. 6, No. 10, Oct. 1989, pp. 1513-1521, doi: 10.1364/JOSAA.6.001513.
Azzam et al., "General analysis and optimization of the four-detector photopolarimeter", Journal of the Optical Society of America A, vol. 5, No. 5, May 1988, pp. 681-689, doi: 10.1364/JOSAA.5.000681.
Azzam et al., "Photopolarimeter based on planar grating diffraction", Journal of the Optical Society of America A, vol. 10, No. 6, Jun. 1993, pp. 1190-1196, doi: 10.1364/JOSAA.10.001190.
Bao et al., "Toward the capacity limit of 2D planar Jones matrix with a single-layer metasurface", Science Advances, vol. 7, No. 25, Jun. 18, 2021, pp. 1-6, doi: 10.1126/sciadv.abh0365.
Berry, "Quantal phase factors accompanying adiabatic changes", Proceedings of the Royal Society A Mathematical, Physical and Engineering Sciences, vol. 392, No. 1802, Mar. 8, 1984, pp. 45-57, doi: 10.1098/rspa.1984.0023.

(56)          References Cited

OTHER PUBLICATIONS

Berry et al., "Measurement of the Stokes parameters of Light", Applied Optics, vol. 16, No. 12, Dec. 1977, pp. 3200-3205, doi: 10.1364/AO.16.003200.

Birch et al., "3D Imaging with Structured Illumination for Advanced Security Applications", Sandia Report, Sep. 2015, retrieved from the internet: URL: <https://www.osti.gov/biblio/1221516>, 64 pgs., doi: 10.2172/1221516.

Blanchard et al., "Modeling nanoscale V-shaped antennas for the design of optical phased arrays", Physical Review B, vol. 85, No. 155457, Apr. 30, 2012, pp. 155457-1-155457-11, doi: 10.1103/physRevB.85.155457.

Bomzon et al., "Pancharatnam-Berry phase in space-variant polarization-state manipulations with subwavelength gratings", Optics Letters, vol. 26, No. 18, Sep. 15, 2011, pp. 1424-1426, doi: 10.1364/OL.26.001424.

Bomzon et al., "Real-time analysis of partially polarized light with a space-variant subwavelength dielectric grating", Optics Letters, vol. 27, No. 3, Feb. 1, 2002, pp. 188-190, doi: 10.1364/OL.27.000188.

Bomzon et al., "Spatial Fourier-transform polarimetry using space-variant subwavelength metal-stripe polarizers", Optics Letters, vol. 26, No. 21, Nov. 1, 2001, pp. 1711-1713, doi: 10.1364/OL.26.001711.

Buralli et al., "Optical performance of holographic kinoforms", Applied Optics, vol. 28, No. 5, Mar. 1, 1989, pp. 976-983, doi: 10.1364/AO.28.000976.

Byrnes et al., "Designing large, high-efficiency, high-numerical-aperture, transmissive meta-lenses for visible light", Optics Express, vol. 24, No. 5, Mar. 7, 2016, pp. 5110-5124, doi: 10.1364/OE.24.005110.

Campione et al., "Tailoring dielectric resonator geometries for directional scattering and Huygens' metasurfaces", Optics Express, vol. 23, No. 3, Feb. 9, 2015, pp. 2293-2307, doi: 10.1364/OE.23.002293.

Capaldo et al., "Nano-fabrication and characterization of silicon meta-surfaces provided with Pancharatnam-Berry effect", Optical Materials Express, vol. 9, No. 3, Mar. 1, 2019, pp. 1015-1032, doi: 10.1364/OME.9.001015.

Cerjan et al., "Achieving Arbitrary Control over Pairs of Polarization States Using Complex Birefringent Metamaterials", Physical Review Letters, vol. 118, No. 253902, Jun. 23, 2017, pp. 253902-1-253902-5, doi: 10.1103/PhysRevLett.118.253902.

Chen et al., "A broadband achromatic metalens for focusing and imaging in the visible", Nature Nanotechnology, vol. 13, Jan. 1, 2018, pp. 220-226, doi: 10.1038/s41565-017-0034-6.

Chen et al., "A review of metasurfaces: physics and applications", Reports on Progress in Physics, vol. 79, No. 7, Jun. 16, 2016, 40 pgs., doi: 10.1088/0034-4885/79/7/076401.

Chen et al., "Broadband Achromatic Metasurface-Refractive Optics", Nano Letters, vol. 18, No. 12, Nov. 13, 2018, pp. 7801-7808, doi: 10.1021/acs.nanolett.8b03567.

Chen et al., "Dual-polarity plasmonic metalens for visible light", Nature Communications, vol. 3, No. 1198, Nov. 13, 2012, pp. 1-6, doi: 10.10388/ncomms2207.

Chen et al., "Engineering the Phase Front of Light with Phase-Change Material Based Planar Lenses", Scientific Reports, vol. 5, No. 8660, Mar. 2, 2015, 7 pgs., doi: 10.1038/srep08660.

Chen et al., "High-Efficiency Broadband Meta-Hologram with Polarization-Controlled Dual Images", Nano Letters, vol. 14, No. 1, Dec. 13, 2013, pp. 225-230, doi: 10.1021/nl403811d.

Chen et al., "Immersion Meta-Lenses at Visible Wavelengths for Nanoscale Imaging", Nano Letters, vol. 17, No. 5, Apr. 7, 2017, pp. 3188-3194, doi: 10.1021/acs.nanolett.7b00717.

Chen et al., "Integrated plasmonic metasurfaces for spectropolarimetry", Nanotechnology, vol. 27, No. 22, Apr. 26, 2016, 7 pgs., doi: 10.1088/0957-4484/27/22/224002.

Chen et al., "Phase and dispersion engineering of metalenses: broadband achromatic focusing and imaging in the visible", arXiv:1711.09343 [physics.optics][v1], Nov. 26, 2017, 30 pgs.

Chen et al., "Supplementary Information of Engineering the Phase Front of Light with Phase-Change Material Based Planar Lenses", Scientific Reports, vol. 5, No. 8660, 2015, 4 pgs.

Chou et al., "Imprint Lithography with 25-Nanometer Resolution", Science, vol. 272, No. 5258, Apr. 5, 1996, pp. 85-87, doi: 10.1126/science.272.5258.85.

Chou et al., "Subwavelength amorphous silicon transmission gratings and applications in polarizers and waveplates", Applied Physics Letters, vol. 67, No. 6, Aug. 7, 1995, pp. 742-744, doi: 10.1063/1.115211.

Cincotti, "Polarization Gratings: Design and Applications", IEEE Journal of Quantum Electronics, vol. 39, No. 12, Dec. 2003, pp. 1645-1652, doi: 10.1109/JQE.2003.819526.

Zhou et al., "Plasmonic holographic imaging with V-shaped nanoantenna array", Optics Express, vol. 21, No. 4, Feb. 25, 2013, pp. 4348-4354, doi: 10.1364/OE.21.004348.

Zhou et al., "Progress on vertical-cavity surface-emitting laser arrays for infrared illumination applications", Proceedings of SPIE, Vertical-Cavity Surface-Emitting Lasers XVIII, vol. 9001, 90010E, Feb. 27, 2014, 11 pgs., doi: 10.1117/12.2040429.

Zhu et al., "Ultra-compact visible chiral spectrometer with meta-lenses", APL Photonics, vol. 2, No. 036103, Feb. 7, 2017, pp. 036103-1-036103-12, doi: 10.1063/1.4974259.

Zou et al., "Dielectric resonator nanoantennas at visible frequencies", Optics Express, vol. 21, No. 1, Jan. 14, 2013, pp. 1344-1352, doi: 10.1364/OE.21.001344.

* cited by examiner

250b

102 Take and store image with polarization camera

104 Take subsequent image with polarization camera

252 Detect an object in the subsequent image?

No

Yes

108 Examine polarization data to determine if the object is a mask/screen or paper 106 First and second images the same?

No

Yes

112 Is the polarization signature 3D?

No

Yes

110 Deny access

114 Grant access

SPOOF-RESISTANT FACIAL RECOGNITION THROUGH ILLUMINATION AND IMAGING ENGINEERING

CROSS-REFERENCE TO RELATED APPLICATIONS

This application claims the benefit of and priority under 35 U.S.C. § 119 (e) to U.S. Provisional Patent Application Ser. No. 63/265,617, entitled "Spoof-Resistant Facial Recognition Through Illumination and Imaging Engineering" and filed Dec. 17, 2021, which is incorporated herein by reference in its entirety for all purposes.

FIELD OF THE INVENTION

The present invention generally relates to spoof resistant object recognition utilizing polarization.

BACKGROUND

Metasurface elements are diffractive optical elements in which individual waveguide elements have subwavelength spacing and have a planar profile. Metasurface elements have recently been developed for application in the UV-IR bands (300-10,000 nm). Compared to traditional refractive optics, metasurface elements abruptly introduce phase shifts onto light field. This enables metasurface elements to have thicknesses on the order of the wavelength of light at which they are designed to operate, whereas traditional refractive surfaces have thicknesses that are 10-100 times (or more) larger than the wavelength of light at which they are designed to operate. Additionally, metasurface elements have no variation in thickness in the constituent elements and thus are able to shape light without any curvature, as is required for refractive optics. Compared to traditional diffractive optical elements (DOEs), for example binary diffractive optics, metasurface elements have the ability to impart a range of phase shifts on an incident light field, at a minimum the metasurface elements can have phase shifts between 0-2π with at least 5 distinct values from that range, whereas binary DOEs are only able to impart two distinct values of phase shift and are often limited to phase shifts of either 0 or 1π. Compared to multi-level DOE's, metasurface elements do not require height variation of its constituent elements along the optical axis, only the in-plane geometries of the metasurface element features vary. Metasurface elements may be utilized in polarization sensing devices.

SUMMARY OF THE DISCLOSURE

Systems and methods in accordance with various embodiments of the invention can include a system for object recognition including: an illumination device configured to illuminate an object; a sensor device, where the sensor device receives illumination light reflected off the object which includes polarization information; a processor; memory including programming executable by the processor to: calculate the polarization information from the illumination light; use the polarization information to determine whether the object is a real 3D object.

In various other embodiments, the sensor device and/or the illumination device comprise one or more metasurface optical elements.

In still various other embodiments, the memory further includes programming that is configured to use the polarization information to determine whether the object is a real 3D object or whether the object is a picture of an object, a mask of a 3D object, or a video of a 3D object.

In still various other embodiments, the polarization information includes at least one selected from the group consisting of: an $S_1$ polarization, an $S_2$ polarization, an $S_3$ polarization, a degree of polarization (DoP), and an azimuth.

In still various other embodiments, the $S_1$ polarization, the $S_2$ polarization, the $S_3$ polarization is defined as:

$S_0$=I;
$S_1$=Ip cos 2ψ cos 2χ;
$S_2$=Ip sin 2ψ cos 2χ; and
$S_3$=Ip sin 2χ, where the $S_0$ polarization corresponds to an original monochromic image.

In still various other embodiments, the DoP is calculated by $$DoP = \frac{\sqrt{S_1^2 + S_2^2 + S_3^2}}{S_0}.$$

In still various other embodiments, the memory further includes programming programming executable by the processor to compare an original optical image of the object to a subsequent optical image of the object to perform object recognition.

In still various other embodiments, the original optical image and the subsequent optical image are 2D near infrared images.

In still various other embodiments, the original optical image and the subsequent optical image are polarization images.

In still various other embodiments, the memory further includes programming executable by the processor to determine whether portions of the original optical image and/or the subsequent optical image are not real, where comparing the original optical image to the subsequent optical image of the object is not performed on the portions of the original optical image and/or the subsequent optical image determined to be not real.

In still various other embodiments, the portions of the original optical image and/or the subsequent optical image that are not real are of a mask, sunglasses, and/or a beard.

In still various other embodiments, determining whether portions of the original optical image and/or the subsequent optical image are not real is performed based on the polarization information from the illumination light.

In still various other embodiments, the object includes a face.

In still various other embodiments, the memory further includes programming that is configured to perform an object detection algorithm.

In still various other embodiments, the memory further includes programming that is configured to utilize the results from the object detection algorithm to separate out object pixels from non-object pixels.

In still various other embodiments, the sensor device further receives an initial image and a subsequent image, and the memory further includes programming that is configured to compare the initial image with the subsequent image to determine whether the initial image and the subsequent image are substantially the same.

In still various other embodiments, comparing the initial image with the subsequent image is only performed on the object pixels of the subsequent image.

In still various other embodiments, the illumination source includes an LED or VCSEL array.

In still various other embodiments, the illumination source further includes sunlight.

In still various other embodiments, the system further includes an ambient light sensor configured to determine the amount of sunlight, where the memory further includes programming executable by the processor to alter the amount of light outputted by the LED or VCSEL array based on the amount of sunlight.

In still various other embodiments, the system further includes a bandpass filter configured to pass a certain wavelength of light from the sunlight.

In still various other embodiments, the illumination source includes sunlight.

Further, systems and methods in accordance with various embodiments of the invention can include a method for verifying object recognition, the method including: illuminating an object with a source of light; sensing the light reflected off the object for polarization information; and determining, using the polarization information, whether the object is a real 3D object.

In various other embodiments, illuminating the object is performed by an illumination device, sensing the light reflected off the object is performed by a sensor device, and where the sensor device and/or the illumination device include one or more metasurface elements.

In still various other embodiments, the method further includes using the polarization information to determine whether the object is a real 3D object or whether the object is a picture of an object, a mask of a 3D object, or a video of a 3D object.

In still various other embodiments, the polarization information includes at least one selected from the group consisting of: an $S_1$ polarization, an $S_2$ polarization, an $S_3$ polarization, a degree of polarization (DoP), and an azimuth.

In still various other embodiments, the $S_1$ polarization, the $S_2$ polarization, the Ss polarization is defined as:

$S_0$=I;
$S_1$=Ip cos 2ψ cos 2χ;
$S_2$=Ip sin 2ψ cos 2χ; and
$S_3$=Ip sin 2χ, where the $S_0$ polarization corresponds to an original monochromic image.

In still various other embodiments, the DoP is calculated by $$DoP = \frac{\sqrt{S_1^2 + S_2^2 + S_3^2}}{S_0}.$$

In still various other embodiments, the method further includes comparing an original optical image of the object to a subsequent optical image of the object to perform object recognition.

In still various other embodiments, comparing the original optical image to the subsequent optical image is performed before the determining whether the object is a real 3D object.

In still various other embodiments, comparing the original optical image to the subsequent optical image is performed after the determining whether the object is a real 3D object.

In still various other embodiments, the method further includes determining whether portions of the original optical image and/or the subsequent optical image are not real, where comparing the original optical image to the subsequent optical image of the object is not performed on the portions of the original optical image and/or the subsequent optical image determined to be not real.

In still various other embodiments, the portions of the original optical image and/or the subsequent optical image that are not real are of a mask, sunglasses, and/or a beard.

In still various other embodiments, determining whether portions of the original optical image and/or the subsequent optical image are not real is performed based on the polarization information from the illumination light.

In still various other embodiments, the object includes a face.

In still various other embodiments, the method further includes performing an object detection algorithm.

In still various other embodiments, the method further includes utilizing the results from the object detection algorithm to separate out object pixels from non-object pixels.

In still various other embodiments, the method further includes receiving an initial image and a subsequent image, and comparing the initial image with the subsequent image to determine whether the initial image and the subsequent image are substantially the same.

In still various other embodiments, comparing the initial image with the subsequent image is only performed on the object pixels of the subsequent image.

In still various other embodiments, the source of light includes an LED or VCSEL array.

In still various other embodiments, the source of light further includes sunlight.

In still various other embodiments, the method further including determining the amount of sunlight and altering the amount of light outputted by the LED or VCSEL array based on the amount of sunlight.

In still various other embodiments, the method further includes filtering out a certain wavelength of light from the sunlight.

In still various other embodiments, the source of light includes sunlight.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The description will be more fully understood with reference to the following figures, which are presented as exemplary embodiments of the invention and should not be construed as a complete recitation of the scope of the invention, wherein.

DETAILED DESCRIPTION

In many examples, two-dimensional facial recognition algorithms include taking a first 2D photo of an individual that is verified to be a real person and then comparing this 2D photo to subsequent photos of an individual to key features from the original (e.g., distance between the eyes, mouth shape, etc.). The comparison may be performed through a machine learning algorithm. If the two images are substantially the same, the system will validate the authenticity of the individual and in the case of a security system, provide the individual access. These facial recognition algorithms may be implemented in smart devices such as a smartphone. Because these systems may function on 2D information alone, such systems are susceptible to being tricked or spoofed through various techniques such as a non-authentic individual holding up a high resolution print out of the authentic individual or, in cases where the 2D system also looks for movement of the person to verify identity, playing back a video of the authentic individual.

In contrast, 3D authentication systems which include a supplemental technology, such as structured light or time of flight, in addition to the 2D image aim to verify with additional information such as the depth of an individual's features. In such a case the system may become robust to attacks with a simple 2D likeness of the authentic individual. These 3D systems can still be susceptible to sophisticated attacks with masks that have the likeness of the authentic individual. These 3D systems may also add inherent complexity, cost, and size compared to their 2D counterparts. In some embodiments, the 3D system may be added in addition to the 2D imaging system.

Various embodiments of the present disclosure include a system that only utilizes 2D information but remains robust to attacks that typically trick or spoof the simple 2D facial recognition system described above. Some embodiments of the presently disclosed system make use of an imaging and illumination system that is able to completely and uniquely identify the polarization state of reflected light from a scene. By analyzing just the 2D image and/or the corresponding polarization state parameters of the image, the system may be robust to spoofs such as 2D photos, videos, and 3D masks. In general, the disclosed invention works as described through the flow chart in the figures described below.

Figure 1A:
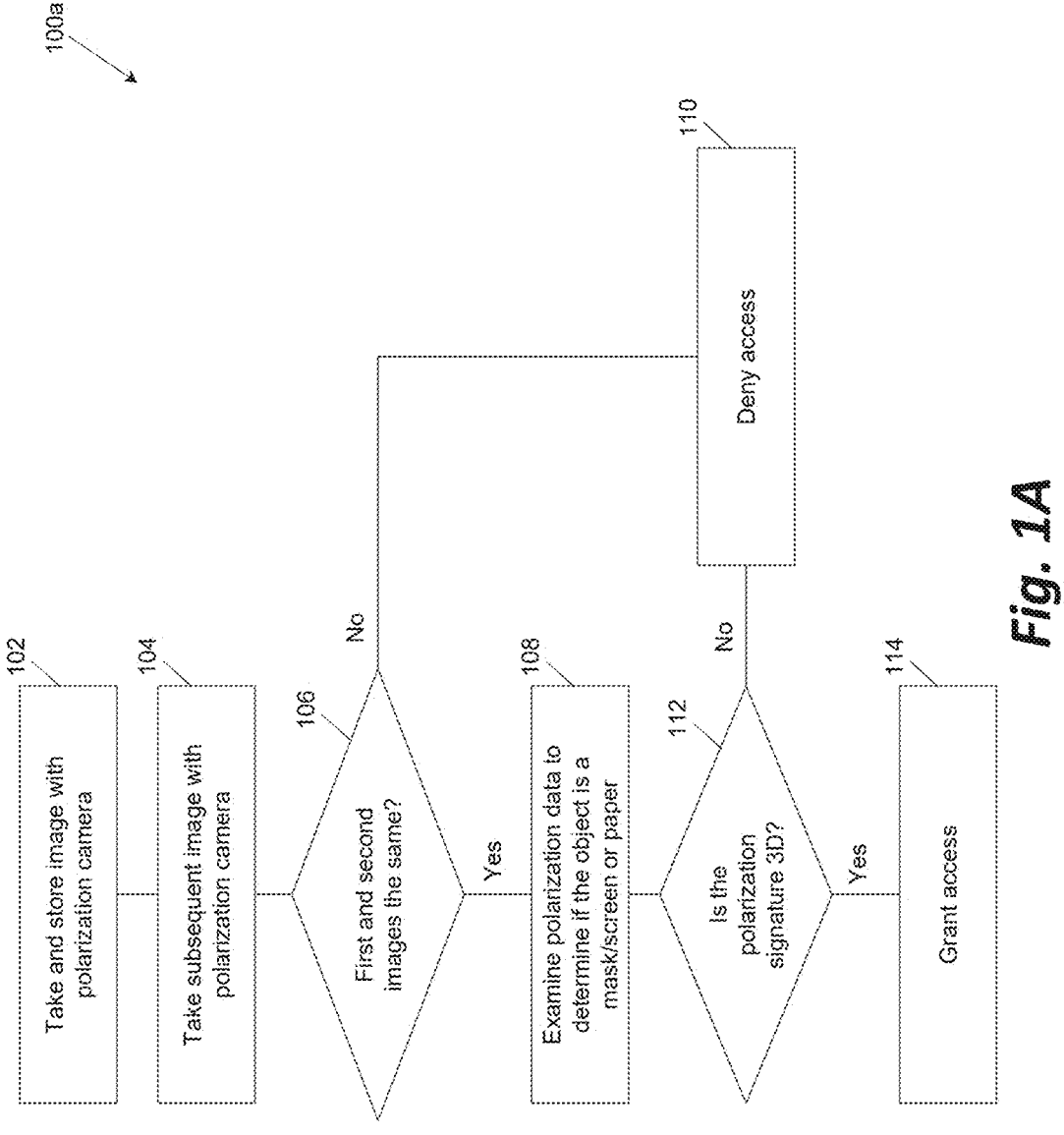
FIGS. 1A and 1B are various flow charts describing methods utilizing polarization state of the reflected light to validate a facial recognition in accordance with embodiments of the invention.
Figure 1B:
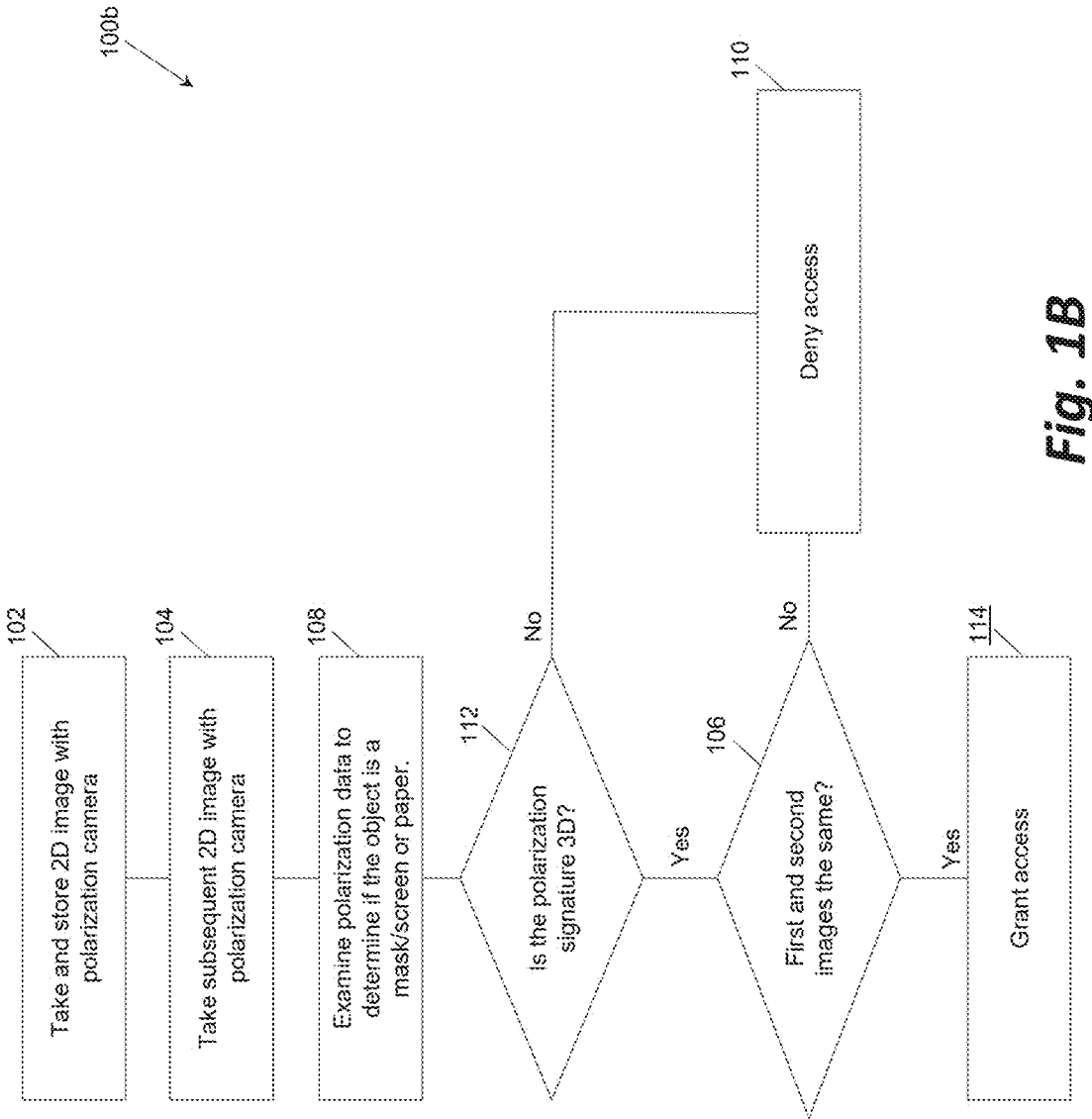

FIGS. 1A and 1B are various flow charts describing methods utilizing the polarization state parameters of the reflected light to validate a facial recognition in accordance with embodiments of the invention. These methods may be performed by a system including a polarization camera, and in some embodiments by a polarization camera which utilizes a metasurface to produce the polarization state images.

FIG. 1A is a flow chart of a method 100a of object recognition utilizing polarization states in accordance with an embodiment of the invention. In FIG. 1A, the method 100a includes taking (102) a first image (e.g. an initial image) including a polarization of a scene, face, or object. In some embodiments, the polarization of the first image may be utilized similar to block 112 to determine whether the first image is "real." If the first image is not determined to be "real" then the method may prompt the user to take another first image. The method 100a further includes taking (104) a subsequent image of the same scene, face, or object at a later time. The first image and/or the subsequent image may be a set of images close in time—e.g. the same scene or object with one or more images taken in less than 1 second, less than 5 seconds, or less than 10 seconds. In some embodiments, the first image and/or the subsequent image is taken followed closely by a polarization image, or multiple snapshots of the same imaging close in time. In some embodiments, the first image and the subsequent image may be from a 2D near infrared (NIR) photo/camera image (e.g. for intensity, etc.) in conjunction with separate polar images. However, in some embodiments, the first image and the subsequent image may be polarization images (e.g. without the 2D NIR images). Thus, the subsequent image may be utilized in block 112 to determine whether the scene, face, or object is a 3D scene, face, or object without taking another polarization image. In subsequent steps, the polarization images may be compared to verify the authenticity of an object. The method 100a further includes comparing (106) the first image and the subsequent image to see if they are substantially the same. In some embodiments, the comparison is with 2D images or polarization images comparison when utilizing a polarization image for the first image and the subsequent image. In some embodiments, the first image may be a first polarization image and the subsequent image may also be a polarization image and if they are compared and found to be the same, then other polarization images may be utilized to determine whether the first image and the subsequent image are of a real 3D object. If the images are not the same, the system denies (110) the user access. If the images are the same, the system then examines 108 the captured polarization information to ensure the object is a real object and not a 2D photo, 2D video, 2D mask, and/or a person wearing a mask. This may include assessing the texture, depth and/or other "real" parameters, and/or the relative intensity of pixels or portions of images in the polarization images. In some embodiments, examining 108 the captured polarization information to ensure the object is a real object includes analyzing parameters, metrics, and/or benchmarks to determine that the image is "real" 3D image (112). For example, the polarization information and/or 2D image may be analyzed to determine whether the object has the right texture or polarization parameters. If the polarization information confirms that the object is a 3D object then access is granted (114). In some embodiments, the object may be a face or person. The method 100a may perform facial recognition.

FIG. 1B is a flow chart of a method 100b of object recognition utilizing polarization states in accordance with an embodiment of the invention. FIG. 1B shares many of the steps of FIG. 1A. The description of these steps is applicable to the method of FIG. 1B and will not be repeated in detail. In FIG. 1B, the method 100b includes first examining (112) the polarization information to see if the image is of a genuine 3D object before proceeding to compare (106) the two images.

In some embodiments, the method of object recognition may include a preliminary object detection before comparing the two images. The object detection may crop pixels that are not part of the object which may make the rest of the steps more accurate and reduce processing time.

Figure 2A:
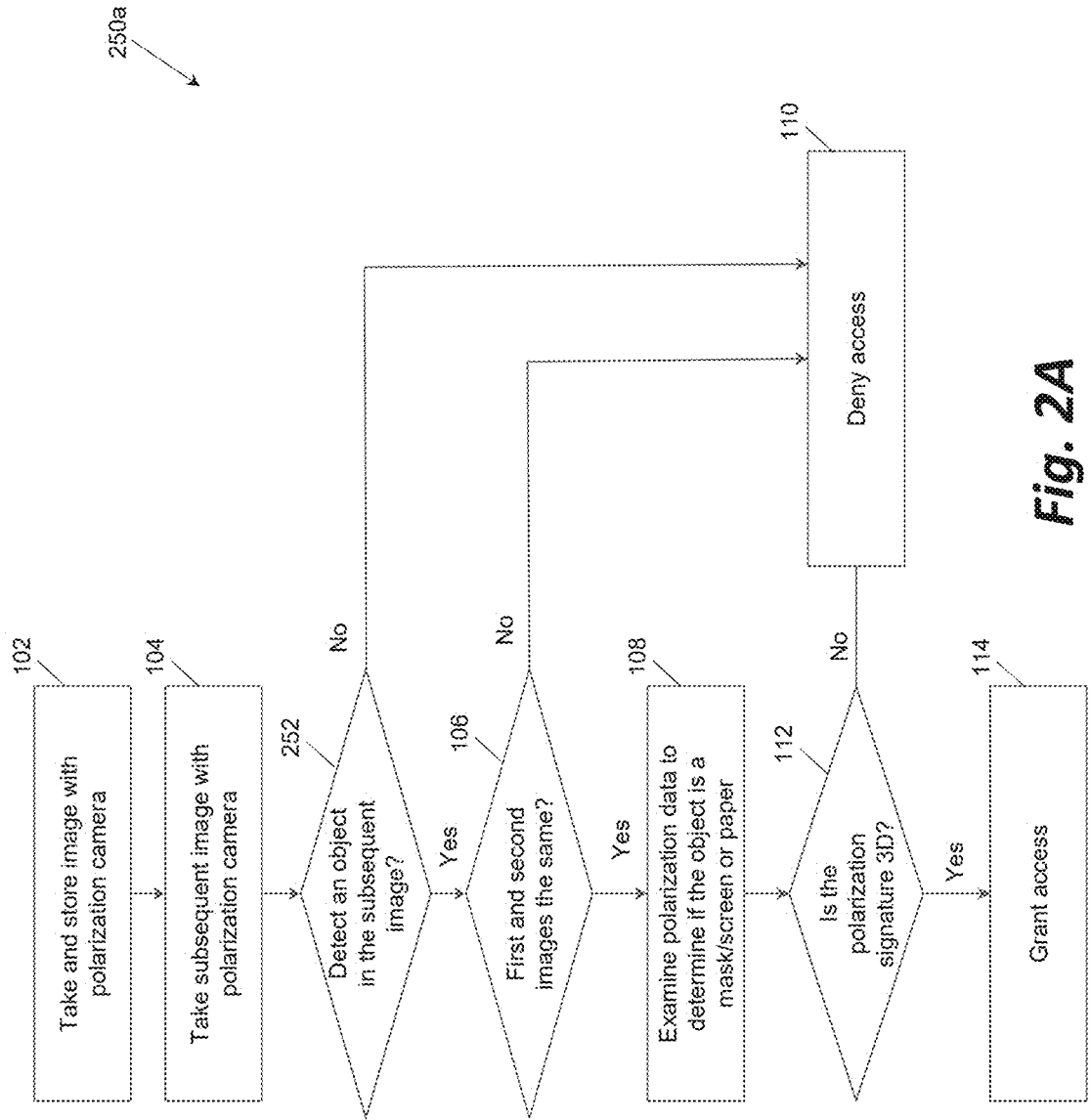
FIG. 2A illustrates a method of object recognition utilizing polarization states including a preliminary object detection in accordance with an embodiment of the invention.

FIG. 2A illustrates a method 250a of object recognition utilizing polarization states including a preliminary object detection in accordance with an embodiment of the invention. FIG. 2A shares many of the steps of FIGS. 1A and 1B. The description of these steps is applicable to the method of FIG. 2A and will not be repeated in detail. In FIG. 2A, the method 250a includes detecting (252) an object in the subsequent image before performing the comparing 106 of the first and second images. The object detection may be a facial detection algorithm. Examples of object detection algorithms are described in Liu, Wei, et al. "Ssd: Single shot multibox detector." European conference on computer vision. Springer, Cham, 2016 which is hereby incorporated by reference in its entirety.

Figure 2B:
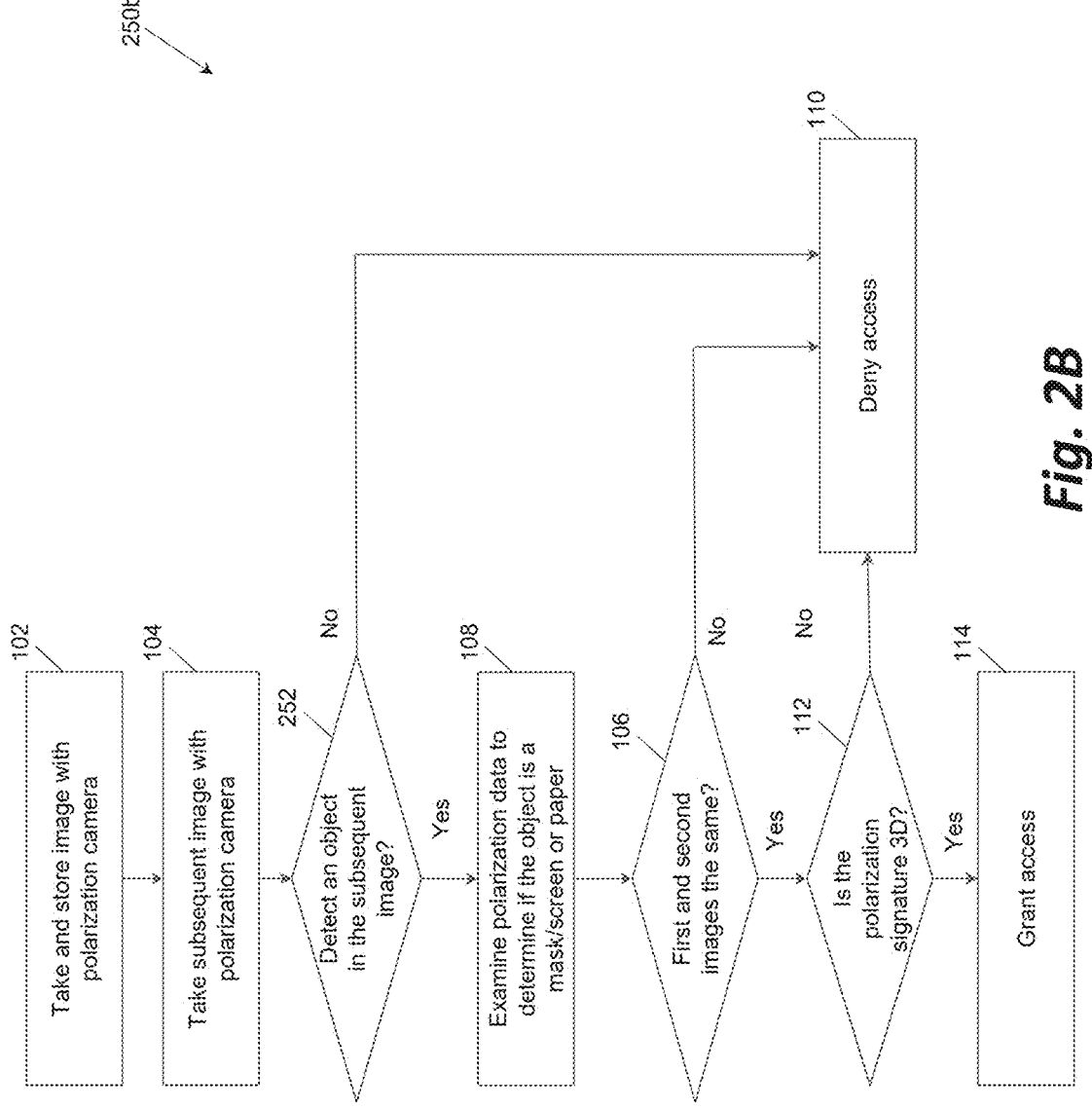
FIG. 2B illustrates a method of object recognition utilizing polarization states including a preliminary object detection in accordance with an embodiment of the invention.

FIG. 2B illustrates a method 250b of object recognition utilizing polarization states including a preliminary object detection in accordance with an embodiment of the invention. FIG. 2B shares many of the steps of FIGS. 1A and 1B. The description of these steps is applicable to the method of FIG. 2B and will not be repeated in detail. FIG. 2B is similar to FIG. 2A except that the polarization information is examined 112 to see if the image is of a genuine 3D object before proceeding to compare 106 the two images. While the object detection 252 is illustrated and described before the image comparing 106 and the polarization information examining 112, in some embodiments, the object detection 252 may be performed after these two steps as well. The object detection 252 may be used to separate pixels which belong to the object from pixels which do not belong to the object (e.g. non-object pixels) which may make the rest of the steps more accurate and reduce processing time.

Figure 3:
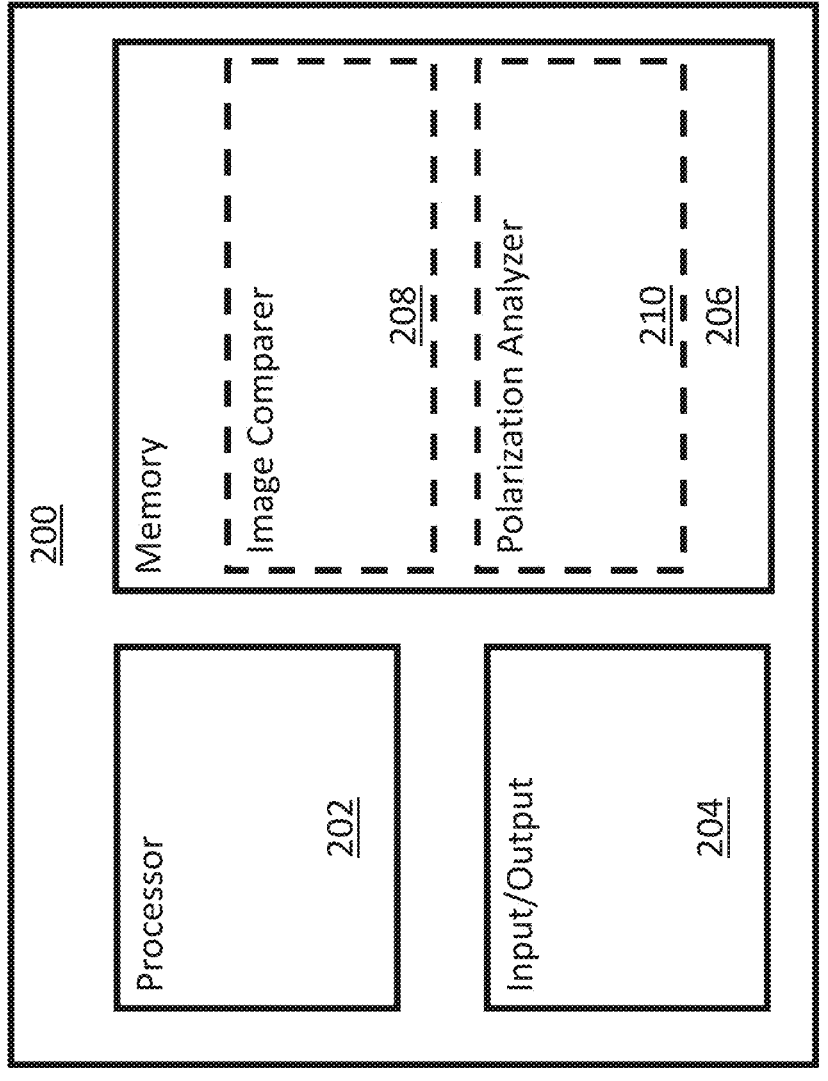
FIG. 3 is a block diagram of a computing system which validates a facial recognition in accordance with an embodiment of the invention.

FIG. 3 is a block diagram of a computing system which validates a facial recognition in accordance with an embodiment of the invention. The system 200 may be a separate computing system or a system implemented on the device capturing the 2D images such as a smartphone. The system 200 includes an input/output 204 which is capable of receiving 2D images including polarization. The system 200 further includes a processor 202 and memory 206. The memory 206 includes programming including a 2D image comparer 208 and a polarization analyzer 210 which is executable by the processor. The image comparer 208 may compare the initial 2D image with the later captured 2D image as discussed above. The polarization analyzer 210 may analyze the polarization of a captured polarization of the later captured 2D image to determine whether the polarization signature is consistent with a 3D object. The image comparer 208 and the polarization analyzer 210 may be used to validate facial recognition as discussed in connection with FIGS. 1A, 1B, 2A, 2B. The input/output 204 may output the results of the validation. The memory 206 may further include programming including a object recognizer (not shown) which is configured to perform the object recognition step 252 of FIGS. 2A and 2B.

Figure 4A:
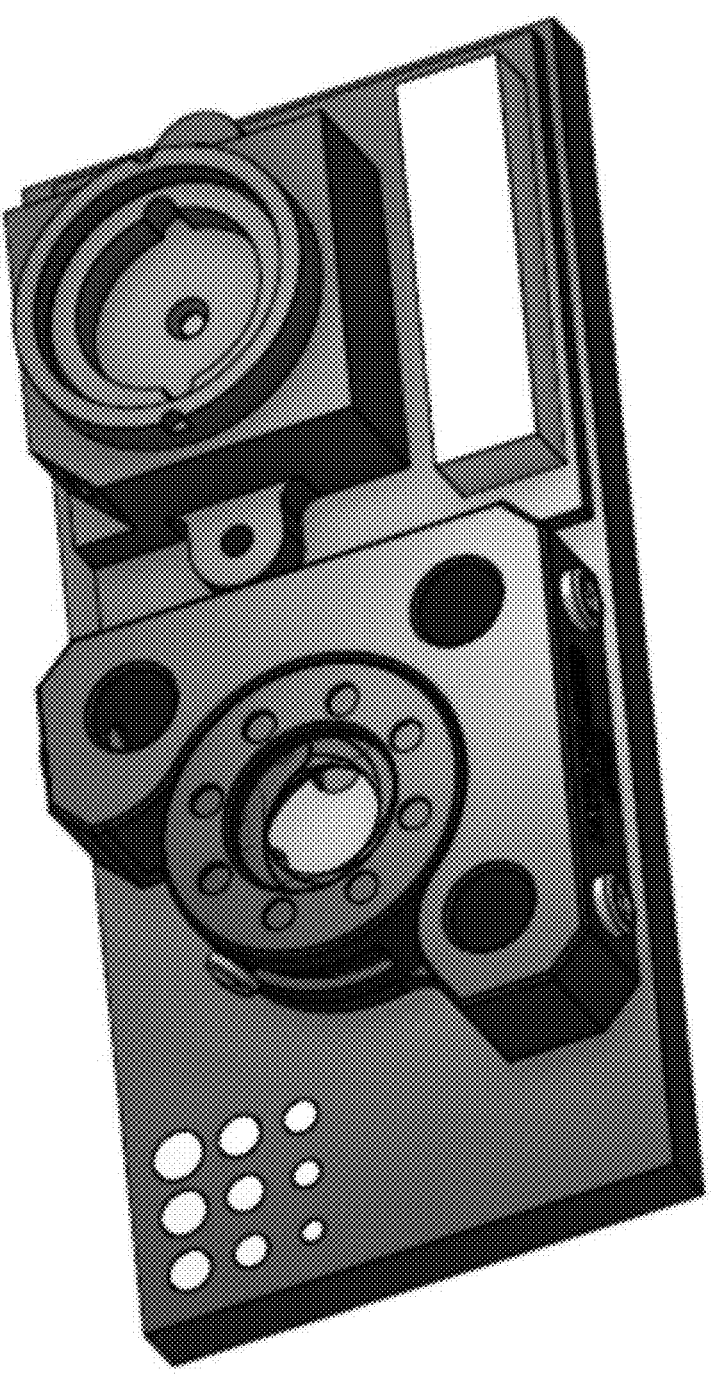
FIG. 4A illustrates an example polarization image capture module in accordance with an embodiment of the invention.

In certain embodiments the imaging system includes both an active illumination source and an imaging sensor or camera. The illumination source may be an illumination device and the imaging sensor or camera may be a sensor device. FIG. 4A illustrates an example polarization image capture module in accordance with an embodiment of the invention. The module includes an active illumination source and a camera which can resolve polarization. In certain embodiments, the camera may resolve the full stokes vector in a single frame. In some embodiments the camera includes one or more metasurfaces configured to produce one or more polarization images with different polarization states. The illumination source may be a light source such as an LED, VCSEL array, or any illumination source that provides a known lighting condition that can be turned on and off.

While the polarization image capture module of FIG. 4A includes an active illumination source, the illumination source may also be sunlight, ambient light or may be sunlight or ambient light supplemented with a light source such as an LED or VCSEL array. The sunlight or ambient light may have a random polarization state in it and also includes a range of wavelengths (e.g. 940 nm and/or typical IR wavelengths). An ambient light sensor may be utilized to turn on or off the light source, or alter the intensity or pattern of the light source, depending on the sunlight/ambient conditions (e.g. the amount of sunlight present). For example, the device may just use sunlight in certain conditions, or use both the light source and sunlight in some conditions. The device may alter the amount of light from the light source dependent on the sunlight conditions. A bandpass filter may be included to filter the wavelengths of the sunlight to only pass one wavelength or a narrow band of wavelengths.

The illumination source can be either preferentially-polarized or unpolarized. In certain embodiments, the light source may be unpolarized or have variable polarization, while in other embodiments the light source may have a fixed polarization state. For example, the light source may be a VCSEL array with a fixed VCSEL polarization. The fixed VCSEL polarization may be achieved through a patterned metasurface aperture on the VCSEL array to achieve a uniform polarization state out of the VCSEL array. In some embodiments, a light source with a fixed polarization state may provide better results than a light source without a polarization. The fixed polarization state may be a linear polarization of light, a circularly polarized light, and/or an elliptically polarized light or any combination of these polarizations of light.

In some embodiments, the illumination source may switch between two or more polarizations in a time resolved method or where it puts out multiple different polarizations in the field of interest. For example, either alternating polarization states may be presented at different times, or two polar states may be presented at the same time. The two polarization states may be orthogonal to each other, or non-orthogonal, and they may be any of two or more of linear, circular or elliptical states. The polarizations may be presented with different patterns of the polarization states, such as for example, flood, dot pattern, batwing pattern, top hat pattern, super-gaussian pattern or other illumination patterns. In some embodiments one or more metasurfaces may be used to produce the various polarization illumination patterns, either simultaneously or alternating, and/or overlapping or physically separated, and/or with different patterns.

In some embodiments, the illumination source and/or the camera may include metasurfaces. Examples of illumination sources and cameras including metasurfaces are described in U.S. Pat. Pub. No. 2019/0064532, entitled "TRANSMISSIVE METASURFACE LENS INTEGRATION" and filed Aug. 31, 2018, which is hereby incorporated by reference in its entirety for all purposes. As described in this Patent Publication, the illumination source and the camera may be included functionally in a single unit. FIG. 4A illustrates an implementation of an illumination source and a camera integrated into a single unit.

In some embodiments, the imaging system may be any imaging system capable of recovering the full polarization information. However, in a more specific case the imaging system may include one or more metasurface optical elements, standard refractive lenses, and a standard CMOS image sensor. The one or more metasurface optical elements may split the scene into two or more polarization states and form two or more sub-images on the CMOS sensor and when these images are suitably computationally recombined, can provide the polarization state of the object being imaged. The imaging system may be a full-stokes polarization camera. An example of a full-stokes polarization camera which incorporates one or more metasurface optical elements is discussed in Rubin NA, D'Aversa G, Chevalier P, Shi Z, Chen W T, Capasso F. Matrix Fourier optics enables a compact full-Stokes polarization camera. Science. 2019 Jul. 5; 365 (6448): eaax1839. doi: 10.1126/science.aax1839. PMID: 31273096 which is hereby incorporated by reference in its entirety.

Figure 4B:
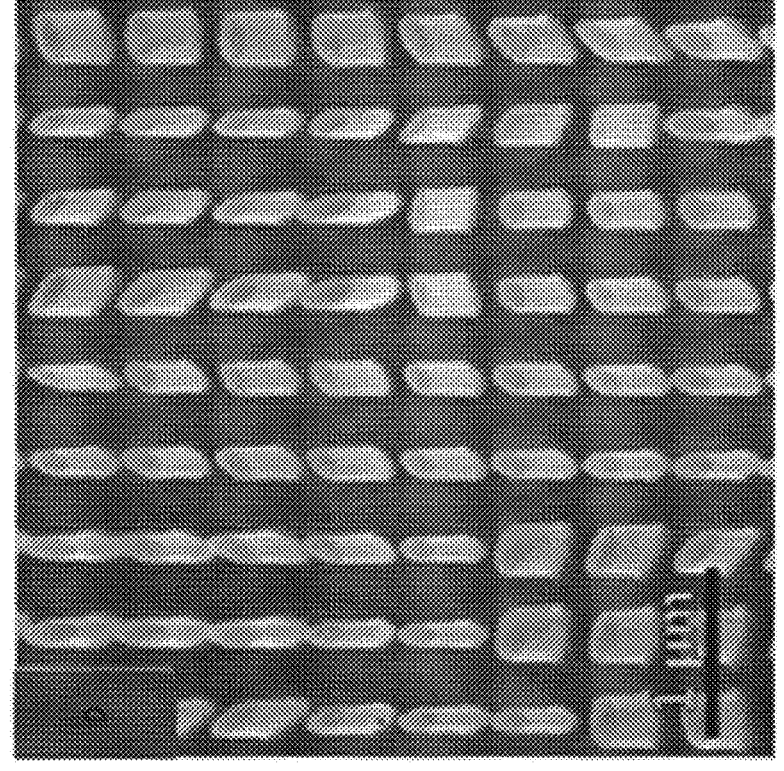
FIG. 4B is various SEM images including different polarization metasurfaces in accordance with an embodiment of the invention.
Figure 4B:
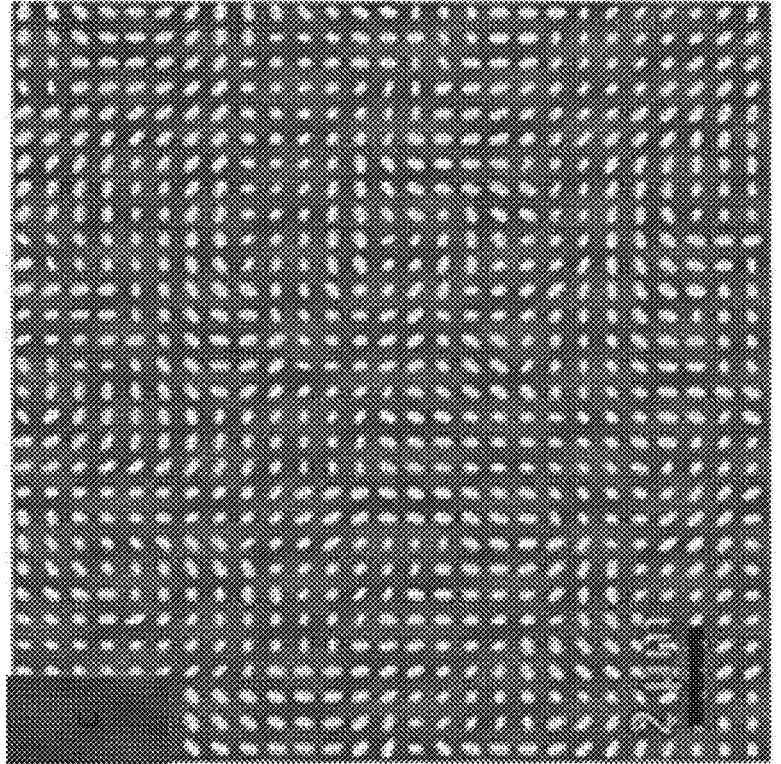

FIG. 4B is various SEM images of an example of polarization metasurface which may be incorporated into the polarization image capture module of FIG. 4A. Further examples of polarization metasurfaces are illustrated in U.S. Pat. Pub. No. 20210286188, entitled "Arbitrary polarization-switchable metasurfaces" and filed Feb. 22, 2019, which is hereby incorporated by reference in its entirety. The polarization metasurface may include silicon posts of one or more shapes including rectangles, squares, and/or ovals in various configurations. The polarization metasurfaces may be in an asymmetric configuration.

Figure 5:
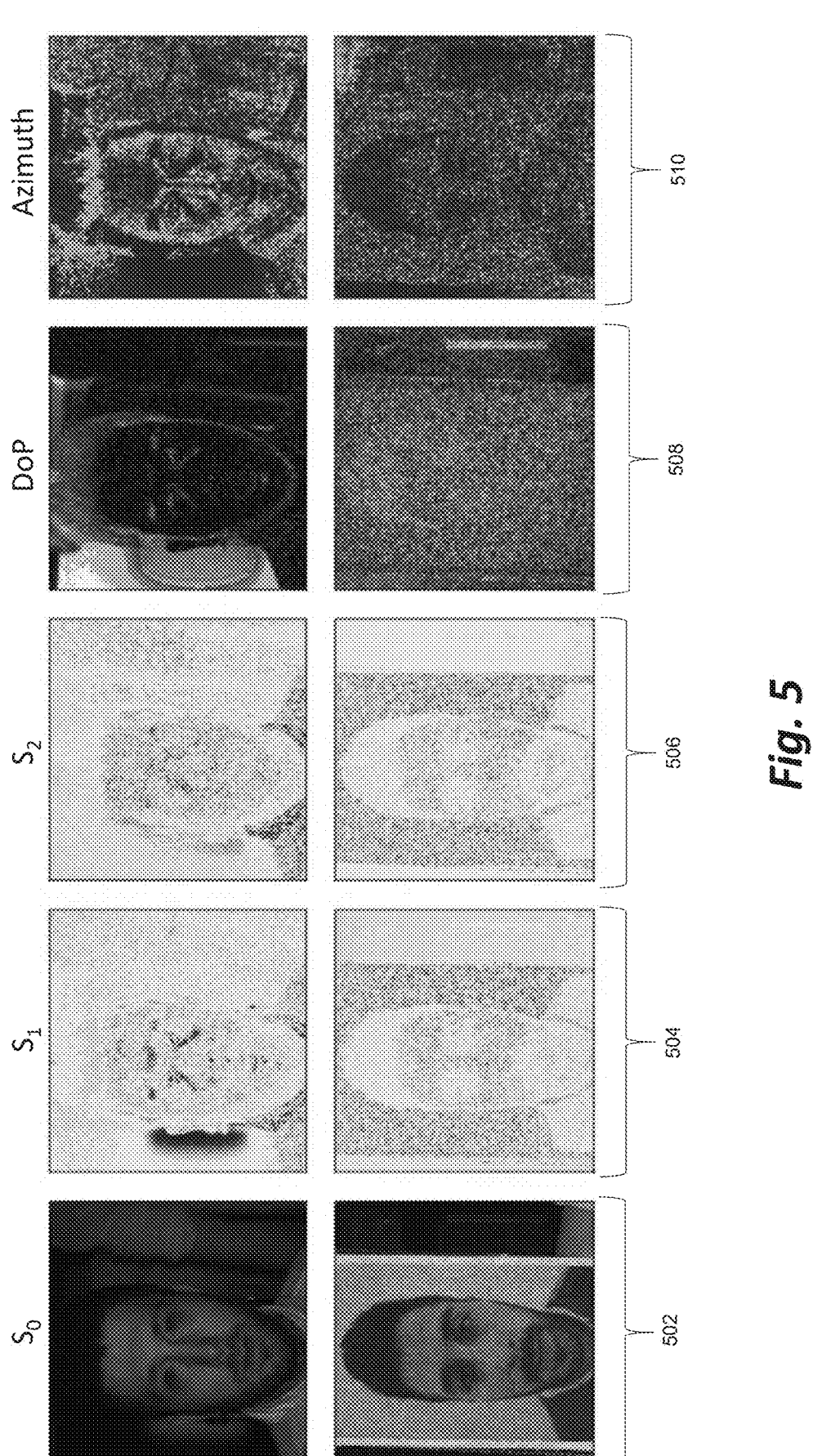
FIG. 5 illustrates a comparison between a real 2D image of an individual and a 2D image of a picture of an individual in accordance with an embodiment of the invention.

FIG. 5 illustrates a comparison between a real 2D image of an individual and a 2D image of a picture of an individual in accordance with an embodiment of the invention. The real 2D image and the 2D image of the picture may be taken with the polarization imaging system described in connection with FIG. 4A. An $S_0$ column 502 is the unfiltered black and white image. The $S_1$ column 504 and $S_2$ column 506 correspond to different stokes parameters. In some embodiments, the polarization imaging system may also image the Ss parameter which may be used to validate the facial recognition. In some embodiments the $S_1$ polarization parameter, $S_2$ polarization parameter, and $S_3$ polarization parameter may be used in combination to assess whether an object is a 2D object or 3D object. The stokes parameters are defined as the following:

$S_0 = I$
$S_1 = Ip \cos 2\psi \cos 2\chi$
$S_2 = Ip \sin 2\psi \cos 2\chi$
$S_3 = Ip \sin 2\chi$ where Ip, $2\psi$, $2\chi$ are the spherical coordinates of the three-dimensional vector of cartesian coordinates ($S_1$, $S_2$, $S_3$), I is the total intensity of the beam, and p is the degree of polarization, constrained by $0 \leq p \leq 1$. The $S_0$ polarization may correspond to an original monochromic image. Further description of the stokes parameters may be found in Young, G., Chipman, R. A., Lam, W. S. T. (2018). Polarized Light and Optical Systems. United Kingdom: CRC Press which is hereby incorporated by reference in its entirety for all purposes.

In some embodiments, degree of polarization (DoP) may be used to assess whether an object is a 2D object or 3D object. A DoP column 508 in FIG. 3 corresponds to the portion of each portion of the image that is polarized. The DoP may be calculated through the following formula:

$$DoP = \frac{\sqrt{S_1^2 + S_2^2 + S_3^2}}{S_0}.$$

A DoP of 1 is completely polarized light. A DoP of 0 is unpolarized light. A DoP between 0 and 1 is partially polarized light. An example of the definition of DoP may be found at <//www.fiberoptics4sale.com/blogs/wave-optics/102492742-stokes-polarization-parameters> which is hereby incorporated by reference in its entirety for all purposes.

An azimuth column 510 corresponds to the angle between the different polarizations $S_1$, $S_2$, and $S_3$. The azimuth between $S_1$ and $S_2$, for example, may be calculated using the following equation:

$$\text{Azimuth} = \arctan\frac{s_2}{s_1}.$$

In some embodiments, linear polarizations including two orthogonal polarizations may be used to validate facial recognition or identify a false object or image, i.e. an intended spoof object or image. For instance, the $S_1$ image may be an image filtered for p-polarization and the $S_2$ image may be an image filtered for s-polarization. Non-orthogonal polarizations may also be used. The multiple different polarization states and their polarization parameters may be used to disambiguate or distinguish between a real or natural 3D object and a fake or spoofed object, and/or to recognize or match faces or objects at two different times. The multiple different polarization states and their polarization parameters may also be used to determine the exact likeness of a face and/or the texture or naturalness of skin or surface textures. Any one or more of the different polarization state parameters can be used individually or in combination. In some embodiments, these different polarization state parameters can be used with algorithmic or machine learning to determine the identity of the image and/or face.

Turning back to FIG. 5, the top images are of a real 2D image of an individual which includes a standard monochrome intensity. In comparison, the bottom images are of a photo of an individual. As illustrated, the contrast between each of the $S_1$, $S_2$, DoP, and/or the Azimuth may be used to determine whether an image is an image of a real 3D shape which corresponds to a real individual or an image of a photo of an individual which would have less contrast. In some embodiments, a combination of the $S_1$, $S_2$, DoP, and/or the Azimuth may be used to determine whether an image is an image of a real 3D shape which corresponds to a real individual or an image of a photo of an individual. In some embodiments, the real 2D image of the individual may include more contrast between the high polarization and the lowest polarization for each of the $S_1$, $S_2$, DoP, and/or the Azimuth than the 2D image of the photo of the individual. In some embodiments, a machine learning algorithm such as a neural network may be used with training data to determine whether an image is an image of a real 3D shape which corresponds to a real individual or an image of a photo of an individual. As illustrated, the monochromatic images $S_0$ alone does not show enough information to determine whether the 2D image is of a real 3D individual or of a photo of an individual. In some embodiments, the relative intensity or other metrics of the various polarization state images may be compared on a pixel-by-pixel basis, or by regions, as part of the comparison process, and/or image processing or machine learning algorithms may be applied.

Figure 6:
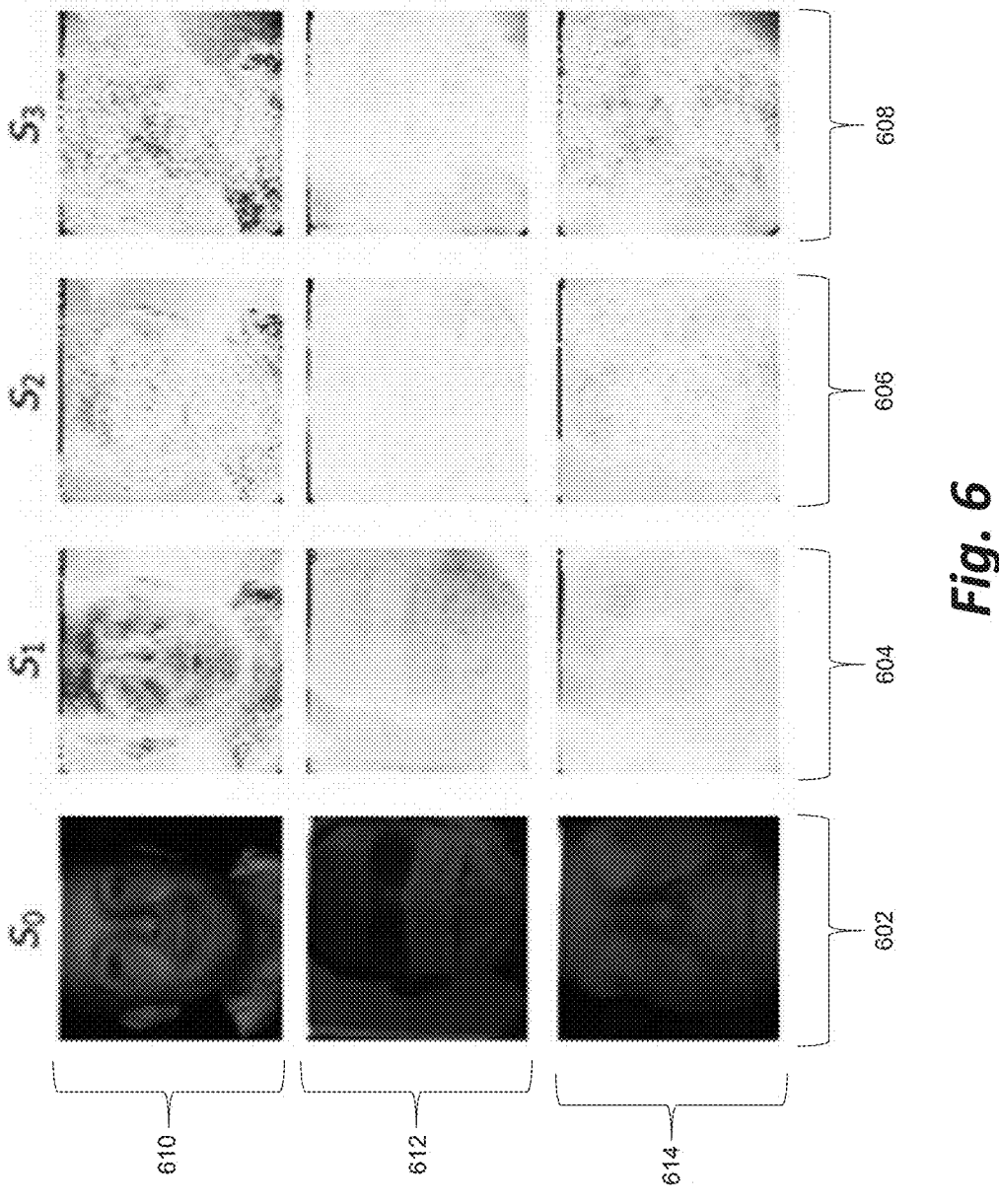
FIG. 6 illustrates a comparison between a real 2D image of an individual, a 2D image of a picture of an individual, and a 2D image of a 3D mask of an individual.

FIG. 6 illustrates a comparison between a real 2D image of an individual, a 2D image of a picture of an individual, and a 2D image of a 3D mask of an individual. The $S_0$, $S_1$, $S_2$, and $S_3$ columns are described above in connection with FIG. 3. The $S_0$ column 502, $S_1$ column 504, and $S_2$ column of FIG. 5 correspond to an $S_0$ column 602, an $S_1$ column 604, and an $S_2$ column 606 of FIG. 6. FIG. 6 further includes an Ss column 608 which corresponds to Ss polarization measurements. As illustrated, the Ss polarization measurement may be different polarization measurements than the $S_1$ and $S_2$ polarization measurements.

The top row 610 of images correspond to a real 2D image of an individual. The middle row 612 of images correspond to a 2D image of a picture of an individual. The bottom row 614 of images correspond to a 2D image of a mask of an individual. As illustrated, the contrast between each of the $S_1$, $S_2$, and/or Ss, may be used to determine whether an image is an image of a real 3D shape which corresponds to a real individual or an image of a photo of an individual or an image of a mask of an individual which would have less contrast. In some embodiments, a combination of the $S_1$, $S_2$, and/or Ss, may be used to determine whether an image is an image of a real 3D shape which corresponds to a real individual or an image of a photo of an individual or a mask of an individual. As illustrated, the monochromatic images $S_0$ alone does not show enough information to determine whether the 2D image is of a real 3D individual, of a photo of an individual, or of a mask of an individual.

In some embodiments, a portion of an image is sensed to be "unreal" or "unnatural". For example, if a person has on a mask (e.g. surgical mask, N95 mask, KN-95 mask, dust mask, cosmetic mask), sunglasses, a beard or the like, especially in comparison to a prior image without such added features, then the system may recognize these features based on the polarization state parameters of that region of the image or images of the face. For example, the texture of the part of the face that is covered by a beard or surgical mask may appear altered or "non-skin-like" based on the differences in polarization parameters, either in comparison to benchmarks or as compared to a prior image or images of the face without the added feature. In some embodiments, the texture aspects sensed via the polarization state parameters of one or more polarization images may be used to identify a feature (e.g., a beard, glasses, mask, etc.), and/or for comparison to a later similar set of images to determine identity or matching, and/or to remove that identified feature from later comparison. For example, if a first set of images of a person's face without a surgical mask are taken using the systems and processes described above, and then the same person's face is similarly imaged but now the face has a surgical mask, then the comparison and analysis of the two sets of images may include identifying the surgical mask, either via comparison and/or texture change. In some cases the first set of images has the added feature of a beard or mask, and the second set of features do not have the added feature, and the system and processes described here may be used to distinguish the added feature. In some cases, the analysis or comparison can continue just comparing the two sets of images in the region without the added mask to determine a match or identity. It should be understood that while examples here of facial features and added features (masks, beards, glasses, etc.) to a face are described as examples, the same concepts, systems and processes may be applied to other body parts or inanimate objects to identify features and/or make comparisons of portions that remain unchanged or uncovered by the added features.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for object recognition comprising:
an illumination device configured to illuminate an object;
   wherein the illumination device comprises an LED or VCSEL array; wherein the illumination device further comprises sunlight;
a sensor device, wherein the sensor device receives illumination light reflected off the object which includes polarization information;
an ambient light sensor configured to determine the amount of sunlight;
a processor; and
memory including programming executable by the processor to:
   calculate the polarization information from the illumination light; and
   use the polarization information to determine whether the object is a real 3D object;
   alter the amount of light outputted by the LED or VCSEL array based on the amount of sunlight.

2. The system of claim 1, wherein the sensor device and/or the illumination device comprise one or more metasurface optical elements.

3. The system of claim 1, wherein the memory further includes programming that is configured to use the polarization information to determine whether the object is a real 3D object or whether the object is a picture of an object, a mask of a 3D object, or a video of a 3D object.

4. The system of claim 1, wherein the polarization information includes at least one selected from the group consisting of: an $S_1$ polarization, an $S_2$ polarization, an $S_3$ polarization, a degree of polarization (DoP), and an azimuth.

5. The system of claim 4, wherein the $S_1$ polarization, the $S_2$ polarization, the $S_3$ polarization is defined as:
$S_0 = I$;
$S_1 = Ip \cos 2\psi \cos 2\chi$;
$S_2 = Ip \sin 2\psi \cos 2\chi$; and
$S_3 = Ip \sin 2\chi$,
   wherein the $S_0$ polarization corresponds to an original monochromic image.

6. The system of claim 5, wherein the DoP is calculated by $$DoP = \frac{\sqrt{S_1^2 + S_2^2 + S_3^2}}{S_0}.$$

7. The system of claim 1, wherein the memory further includes programming executable by the processor to compare an original optical image of the object to a subsequent optical image of the object to perform object recognition.

8. The system of claim 7, wherein the original optical image and the subsequent optical image are 2D near infrared images.

9. The system of claim 7, wherein the original optical image and the subsequent optical image are polarization images.

10. The system of claim 7, wherein the memory further includes programming executable by the processor to determine whether portions of the original optical image and/or the subsequent optical image are not real, wherein comparing the original optical image to the subsequent optical image of the object is not performed on the portions of the original optical image and/or the subsequent optical image determined to be not real.

11. The system of claim 10, wherein the portions of the original optical image and/or the subsequent optical image that are not real are of a mask, sunglasses, and/or a beard.

12. The system of claim 7, wherein determining whether portions of the original optical image and/or the subsequent optical image are not real is performed based on the polarization information from the illumination light.

13. The system of claim 1, wherein the object comprises a face.

14. The system of claim 1, wherein the memory further includes programming that is configured to perform an object detection algorithm.

15. The system of claim 14, wherein the memory further includes programming that is configured to utilize the results from the object detection algorithm to separate out object pixels from non-object pixels.

16. The system of claim 15, wherein the sensor device further receives an initial image and a subsequent image, and wherein the memory further includes programming that is configured to compare the initial image with the subsequent image to determine whether the initial image and the subsequent image are substantially the same.

17. The system of claim 16, wherein comparing the initial image with the subsequent image is only performed on the object pixels of the subsequent image.

18. The system of claim 1, further comprising a bandpass filter configured to pass a certain wavelength of light from the sunlight.

\* \* \* \* \*